United States Patent [19]
Moreno

[11] Patent Number: 5,951,674
[45] Date of Patent: *Sep. 14, 1999

[54] OBJECT-CODE COMPATIBLE REPRESENTATION OF VERY LONG INSTRUCTION WORD PROGRAMS

[75] Inventor: Jaime Humberto Moreno, Hartsdale, N.Y.

[73] Assignee: International Business Machines Corporation, Armonk, N.Y.

[ * ] Notice: This patent is subject to a terminal disclaimer.

[21] Appl. No.: 08/601,640

[22] Filed: Feb. 14, 1996

Related U.S. Application Data

[63] Continuation-in-part of application No. 08/410,431, Mar. 23, 1995, Pat. No. 5,669,001.

[51] Int. Cl.$^6$ .................................................. G06F 9/45
[52] U.S. Cl. .......................................... 712/210; 712/200
[58] Field of Search ................................... 395/376, 380, 395/386; 712/210, 200

[56] References Cited

U.S. PATENT DOCUMENTS

| | | | |
|---|---|---|---|
| 5,442,790 | 8/1995 | Nosenchuck | 395/700 |
| 5,600,806 | 2/1997 | Brown et al. | 395/380 |
| 5,600,810 | 2/1997 | Ohkami | 395/567 |
| 5,669,001 | 9/1997 | Moreno | 395/706 |
| 5,721,854 | 2/1998 | Ebcioglu et al. | 395/379 |

FOREIGN PATENT DOCUMENTS 5289870  5/1993  Japan .

OTHER PUBLICATIONS

IEEE, vol. 37, No. 8, Aug. 1988, "A VLIW Architecture for a Trace Scheduling Compiler", R. Colwell et al., pp. 967–979.

The Journal of Supercomputing, 7, 1993, "The Cydra 5 Minisupercomputer: Architecture and Implementation", G. R. Beck et al., pp. 143–180.

IEEE, Sep. 1981, "An Approach to Scientific Array Processing: The Architectural Design of the AP–120B/FPS–164 Family", A. E. Charlesworth, pp. 18–27.

K. Ebcioglu, "Some Design Ideas for a VLIW Architecture for Sequential–Natured Software", pp. 3–21, Proceedings of the IFIP WG 10.3 Working Conference on Parallel Processing, Pisa, Italy, Apr. 25–27 1988.

*Primary Examiner*—Zarni Maung
*Assistant Examiner*—Saleh Najjar
*Attorney, Agent, or Firm*—Ratner & Presita

[57] ABSTRACT

Object-code compatibility is provided among VLIW processors with different organizations. The object-code can also be executed by sequential processors, thus providing compatibility with scalar and superscalar processors, A mechanism is provided which allows representing VLIW programs in an implementation-independent manner. This mechanism relies on instruction cache (I-cache) reload/access logic which incorporates implementation-dependent features into a VLIW program. In this way, programs are represented in main memory in an implementation-independent manner, the implementation-specific aspects are introduced as part of the instruction cache reload/fetch processes, and the simplicity in instruction dispatch logic that is characteristic of VLIW processors is preserved. The foregoing allows for object-code compatibility among VLIW processors with different organizations. Also provided is a mechanism and an apparatus for the interpretation of tree-instructions by a computer system based on a VLIW processor.

53 Claims, 10 Drawing Sheets

| L0: IF (C0) br TO T1 | IF (C1) br TO T2 | op3 | IF (C3) br TO T3 | op1 | op5 | br V | T3: op2 |
|---|---|---|---|---|---|---|---|
| br W | T2: op4 | IF (C4) skip to T4 | op5 | br Y | T4: op1 | br X | T1: IF (C2) skip to T5 |
| op1 | op4 | br X | T5: op6 | op7 | br Z | | |

Ki: SKIP INSTRUCTION
Pi: OPERATION
--: no-op INSTRUCTION
V, W, X, Y, Z: BRANCH INSTRUCTION

Ci: CONDITION TESTED BY SKIP INSTR.
Ti: TARGET ADDRESS IN BRANCH INSTR.

OBJECT-CODE COMPATIBLE REPRESENTATION OF VERY LONG INSTRUCTION WORD PROGRAMS

CROSS-REFERENCE TO RELATED APPLICATIONS

The present application is a continuation-in-part of U.S. application Ser. No. 08/410,431, filed Mar. 23, 1995, entitled "Object Code Compatible Representation of Very Long Instruction Word Programs", now U.S. Pat. No. 5,669,001.

BACKGROUND OF THE INVENTION

1. Field of the Invention

The present invention generally relates to parallel execution of primitive instructions in data processors and, more particularly, to a mechanism for the representation of very long instruction word (VLIW) programs in such a way that the programs do not reflect the organization (i.e., implementation) of the processor where they are executed.

2. Background Description

A Very Long Instruction Word (VLIW) is an instruction that contains more than one basic (i.e., primitive) instruction. A Very Long Instruction Word processor is a suitable alternative for exploiting instruction-level parallelism in programs; that is, for executing more than one basic (i.e., primitive) instruction at a time. These VLIW processors fetch from the instruction cache a very long instruction word and dispatch the primitive instructions contained in the VLIW to multiple functional units for parallel execution. These capabilities are exploited by compilers which generate code that has grouped together independent primitive instructions executable in parallel. The VLIW processor has relatively simple control logic because it does not perform any dynamic scheduling nor reordering of operations, as is the case in superscalar processors.

An apparent limitation of VLIW processors is the lack of object-code compatibility with the object-code used by sequential (i.e., scalar and superscalar) processors, because such a code has not been parallelized for VLIW. Conversely, an apparent limitation is that the code used by a VLIW processor cannot be used by a scalar or superscalar processor, because the parallel code uses features that exist only in VLIW implementations. Furthermore, another apparent limitation is the lack of object code compatibility for VLIW implementations having varying degrees of parallel execution capabilities, because the code reflects the detailed structure (e.g., parallel execution capabilities) of one specific implementation, which is different from the others. As a result, the VLIW approach appears as unable to enhance an existing family of scalar and superscalar processors, which has lead to the perception that VLIW processors are limited in their suitability for being adopted.

The perceived limitations described above are actually a consequence of how the implementations of the VLIW concept have been carried out in the past. See, for example, R. P. Colwell, R. P. Nix, J. J. O'Donnell, D. B. Papworth and P. K. Rodman, "A VLIW architecture for a trace scheduling compiler", *IEEE Transactions on Computers*, Vol. C-37, No. 8, pp. 967–979, 1988; G. R. Beck, D. W. L. Yen and T. L. Anderson, "The Cydra 5 mini-supercomputer: architecture and implementation", *The Journal of Supercomputing*, Vol. 7, No. 1/2, pp. 143–180, 1993; and A. E. Charlesworth, "An approach to scientific array processing: the architectural design of the AP-120B/FPS-164 family", *IEEE Computer*, Vol. 14, No. 9, pp. 18–27, 1981. Processors such as those reported in these articles have made visible features of the implementation to the compiler/programmer, including the number, types and location of the functional units, under the assumption that the compiler could better exploit the hardware if it has good knowledge of its features and limitations. VLIW programs have been represented as sets of VLIWs which specify exactly the operations performed in each functional unit on a cycle-by-cycle basis, as determined by the compiler (this is known as static scheduling). This is drastically different from the approach used in conventional scalar and superscalar processors, which at run time perform the analysis and decisions regarding which operations are executed in each cycle (known as dynamic scheduling), so that the detailed features of the processor need not be known by the compiler. In other words, the separation among architecture and implementation that is common practice in processor design for scalar and superscalar implementations has been sacrificed in VLIW implementations, in order to better exploit the capabilities of the hardware by the compiler/programmer.

Although the benefits of exposing the details of the implementation to the compiler/programmer are clear, this has lead to the perception that such an exposure is a requirement for a VLIW processor. Thus, there is a need to develop a mechanism that represents a VLIW program without depending on the specific aspects of an implementation, so that the perceived requirement is sustained.

SUMMARY OF THE INVENTION

It is therefore an object of the present invention to eliminate the exposure of a VLIW processor implementation at the architecture level and thereby achieve object-code compatibility in a processor architecture encompassing scalar, superscalar and VLIW implementations.

It is another object of the invention to provide object-code compatibility across VLIW processors having varying levels of parallelism.

It is a further object of the invention to provide object-code compatibility among VLIW processors with different organizations, which object code can be executed by sequential processors.

According to the present invention, a new approach to achieve object-code compatibility in a processor architecture is taken, allowing the same program to be executed in scalar, superscalar and VLIW implementations of the same architecture. In this invention, there is provided a mechanism which allows a VLIW program to be represented in an implementation-independent manner, and which conveys in straight-forward form the fine-grain parallelism extracted by the compiler/programmer. The invention relies on functions that incorporate implementation-dependent features into a VLIW program while the program is being executed, functions which are preferably integrated into the instruction cache (I-cache) reload/access logic but could also be integrated at other levels of the memory hierarchy. There is a one-to-one correspondence among primitive operations in the original and the translated VLIW programs. In this way, programs are represented in an implementation-independent manner (i.e., without reflecting the organization of the processor where they are executed), the implementation-specific aspects are introduced as part of the instruction cache reload/fetch logic, and the simplicity in instruction dispatch logic that is characteristic of VLIW processors is preserved. This allows for object-code compatibility among VLIW processors with different parallel processing capabilities. Moreover, the VLIW programs represented in this manner can also be executed by sequential processors, so that the invention allows object-code compatibility with scalar and superscalar implementations.

The mechanism which incorporates the implementation-dependent features into a VLIW program transforms the original program into one which can be executed in a given processor implementation, by decomposing those VLIWs requiring more resources than the resources available in the processor into two or more smaller VLIWS which fit the implementation constraints, without changing the semantics of the original program. Smaller VLIWs are executed directly. The mechanism does not attempt to combine small VLIWS into larger ones, neither to move primitive operations from one VLIW to another.

The mechanism provided in this invention can also be used to handle programs in which there may exist dependencies among the operations within a VLIW; however, such a feature is not described here.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF THE PRESENT INVENTION

Figure 1:
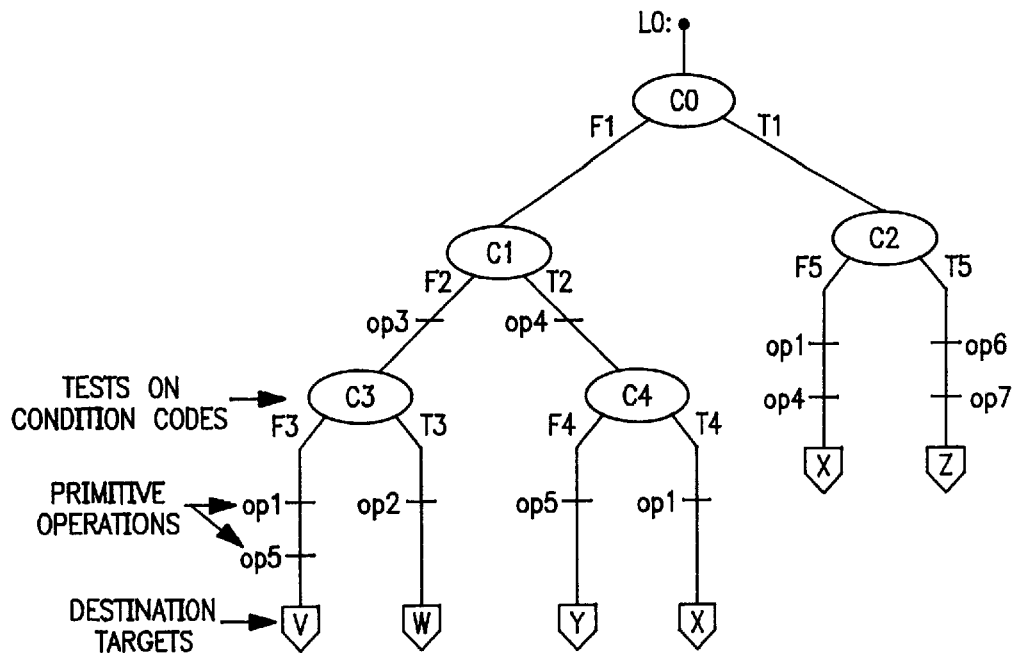
FIG. 1 is a diagram of a tree-instruction illustrating the basic characteristics of a VLIW program.

The description of the present invention that follows is broken down into two parts:

A. Overview of the Present Invention

B. Example of Computer Processing Unit that Embodies the Present Invention

A. Overview of the Present Invention

The invention relies on the following aspects, described in more detail later:

A chunk is the minimal unit of program specification. A chunk may correspond to a single memory word (a memory word is 32 bits), or to several memory words (for example, 4 words), depending on the specific architecture. As a minimum, a processor is capable of executing simultaneously all the operations in one chunk; a processor may also execute simultaneously several chunks, depending on the implementation.

A tree-instruction (TI) is a set of chunks, so that the size of a tree-instruction is a multiple of the size of a chunk. Each tree-instruction consists of an unlimited multiway branch and an unlimited number of primitive operations, so that tree-instructions have variable length. There may exist limitations on the number and type of operations per chunk, depending on the specific architecture.

A VLIW program is a set of tree-instructions.

Throughout the execution of the VLIW program, and as needed by it, the variable-length tree-instructions are converted into variable-length VLIWs which consist of one or several chunks, but whose overall computing requirements do not exceed the computing capabilities of the processor. A tree-instruction which exceeds the computing capabilities of the processor is decomposed into two or more variable-length VLIWs which may be executed sequentially; this decomposition is always performed at a chunk boundary.

The decomposition may be performed at any level of the memory hierarchy but it is performed preferably at I-cache replacement time. In such a case, the tree-instructions are stored in main memory of the computer system; the I-cache reload logic reads the tree-instructions from main memory, formats them as variable-length VLIWs (up to the maximum size possible), and stores them in the I-cache.

The processor executes fixed-length VLIWs extracted from the I-cache; the size and computing requirements of these fixed-length VLIWs match the computing capabilities of the processor. Shorter VLIWS that may exist in the I-cache are expanded to match the fixed-size VLIWS; the expansion may consist of aligning the operations in a shorter VLIW to suitable positions within the fixed-length VLIW, introducing no-op operations to fill empty slots. Alternatively, shorter VLIWS extracted from the I-cache may be augmented with the adjacent primitive operations (beyond their end); these extra primitive operations are disabled from execution by the generation of execution masks during the I-cache access process, masks that exclude the operations which do not belong to the short VLIWS.

As a result, the processor features that are specific to an implementation are incorporated during the execution of the VLIW program, for example by the I-cache reloading and I-cache accessing processes as described above. These processor features include aspects such as maximum number of branches and other primitive operations per VLIW, position of operations within a VLIW, among others. In other words, implementation-independent tree-instructions are translated into implementation-dependent VLIWs, transparently to the compiler/programmer.

Referring now to the drawings, and more particularly to FIG. 1, there is shown a graphical representation of a tree-instruction. In the practice of the invention, a VLIW program consists of a set of tree instructions having the following characteristics in terms of their graphical representation:

Tree-instructions are composed of internal nodes, arcs, and leaves.

Internal nodes correspond to conditional branch instructions; that is, binary tests on condition codes (the condition codes are set by operations on tree-instructions executed previously). Each internal node generates two arcs. The right outgoing arc is selected if the outcome of the test is true; otherwise, the left outgoing arc is selected. A set of internal nodes represents a multiway tree. Only one path within the tree (the selected path) is executed to completion, which is determined by the outcome of the tests on the condition codes; the other paths are discarded. A tree-instruction may have no internal nodes, in which case the tree instruction has a single path.

Each leaf corresponds to an unconditional branch (a destination target); that is, the identification of the next tree-instruction to be executed when the leaf is in the selected path.

Primitive operations other than branches are associated with the arcs. Only those primitive operations associated with the arcs on the selected path of the tree are executed to completion.

All the operations on each path of a tree-instruction are subject to sequential semantics; that is, all operations are subject to a precedence order determined by their appearance on the tree. Operations that appear later in a path cannot use or target a resource which is the target of a previous operation in the path. (If that is not the case, the operations are dependent and cannot be executed in parallel.)

The sequential semantics feature is the key factor for achieving object-code compatibility among scalar and VLIW implementations. All the operations placed in a tree-instruction by a VLIW compiler are independent (i.e., executable in parallel) and match the requirements per chunk of the particular architecture; however, such operations may also be executed sequentially without conflicts. The sequential semantics feature is also the key factor for achieving object-code compatibility when a tree-instruction is executed in an implementation having fewer parallel capabilities than those specified in it; a tree-instruction can be decomposed, at the chunk boundaries, into several VLIWs which are executed sequentially.

Moreover, the sequential semantics feature allows using the exception behavior of scalar processors in a VLIW processor. The selected path in a VLIW may be executed to completion up to the primitive instruction which generates an exception, and continued from that primitive after processing the exception (as if the VLIW had been decomposed into separate VLIWs at the instruction generating the exception).

In the context of this invention, consider for example the tree-instruction depicted in FIG. 1. Assuming that each primitive operation is encoded in a single memory word, and the chunk size is also one memory word, this tree-instruction may be represented in main memory in the sequential form shown in the table below:

L0: skip if (C0) to T1
F1: skip if (C1) to T2
F2: op3
    skip if (C3) to T3
F3: op1
    op5
    branch V
T3: op2
    branch W
T2: op4
    skip if (C4) to T4
F4: op5
    branch Y
T4: op1
    branch X
T1: skip if (C2) to T5
F5: op1
    op4
    branch X
T5: op6
    op7
    branch Z This sequential representation allows for the description of arbitrarily complex tree-instructions, without any explicit reference to the resources required in an implementation for their execution. The sequential representation is obtained by traversing the graphical representation of the tree-instruction in a depth-first manner, listing the tests on the condition codes and the primitive operations that are executed when the corresponding path of the tree is selected. Each testing of a condition code consists of a skip primitive, which corresponds to a flow control operation within the tree-instruction indicating where the description of the tree continues. All destination targets are represented as unconditional branch instructions which specify the next tree-instruction to be executed. The end of a tree-instruction is preferably delimited by a primitive following an unconditional branch instruction which is not reachable by any skip instruction in the tree. This property is used to detect the boundaries of a tree-instruction without having to mark such boundaries explicitly.

Assuming now, for example, that the size of a chunk is two words, and that the architecture requires that the target of a skip instruction must be the first word in a chunk, the tree-instruction in FIG. 1 may be represented in main memory in the sequential form shown in the following table, wherein the chunks are separated by horizontal lines. Note that some no-op instructions were added (denoted in boldface), to ensure that the target of the skip instructions are at the first word in a chunk:

| | |
|---|---|
| L0: | skip if (C0) to T1 |
| F1: | skip if (C1) to T2 |
| F2: | op3 |
| | skip if (C3) to T3 |
| F3: | op1 |
| | op5 |
| | branch V |
| | nop |
| T3: | op2 |
| | branch W |

-continued

```
T2:   op4
      skip if (C4) to T4
F4:   op5
      branch Y
T4:   op1
      branch X
T1:   skip if (C2) to T5
F5:   op1
      op4
      branch X
T5:   op6
      op7
      branch Z
      nop
```

As can be inferred from FIG. 1 and the tables above, any chunk boundary within a tree-instruction can also correspond to the starting point of another tree-instruction, thus allowing the reuse of the object code representing a tree-instruction. For example, the arc labeled T2 in FIG. 1 could be used as a starting point for a tree-instruction containing op4, the test on C4, and the operations that follow such a test. Similarly, the sequence (op2, branch W) can also be used as a simple tree-instruction. As a result, branching into a tree-instruction at a chunk boundary is possible, leading to the execution of a simpler tree-instruction. In terms of the sequential representation, for example, branching into the instruction labeled T2 in FIG. 1 (as destination target of another tree instruction) leads to a tree-instruction composed of the operations starting at T2 up to instruction "branch X". The end of this tree is detected when reaching the primitive instruction T1 because that label is not found in any skip instruction among the operations starting from label T2.

An earlier definition of tree-instructions may be found in K. Ebcioglu, "Some design ideas for a VLIW architecture for sequential natured software", in M. Cosnard et al., editor, *Parallel Processing (Proceedings of IFIP WG 10.3 Working Conference on Parallel Processing*, Pisa, Italy), pp. 3–21, North Holland, April 1988; and S. Moon and K. Ebcioglu, "An efficient resource-constrained global scheduling technique for superscalar and VLIW processors", *Proceedings of the 25th Conference on Microarchitecture* (MICRO-25), pp. 55–71, IEEE Press, December 1992. However, these tree-instructions have fixed size, and do not follow sequential semantics nor the concept of chunks. Moreover, their encoding does not consist of a sequential traversal of the tree-instruction, but corresponds to a direct description of the tree. These tree-instructions are intended for execution in a fixed-size VLIW processor in which the tree-instructions match exactly the computing capabilities of the processor; moreover, the primitive instructions must be padded with no-op operations to align them with the processor computing resources. Consequently, it is not possible to execute the same program in VLIW processors with different parallel execution capabilities. In addition, these tree-instructions must be completely executed in parallel, so they do not allow scalar implementations. On the other hand, advantages of these tree-instructions are that they may be encoded in such a way that each distinct operation appears only once even if the operation is present on two or more different paths of the tree, and do not require a transformation process as the one described in this invention.

In this invention, the execution of a complex tree-instruction in a processor with limited resources is based on the ability to decompose the complex tree into simpler ones which are executed sequentially, without changing the semantics of the corresponding program. This feature is referred to as pruning the tree-instruction. Pruning is performed at chunk boundaries. As a result of pruning, a complex tree-instruction is executed in one or more cycles, depending on the resources available in the target processor. Preferably, pruning is performed as part of the process which translates the tree-instructions into variable-length VLIWs, for example at I-cache replacement time, so that a complex tree in main memory is translated into two or more implementation-dependent VLIWs in the I-cache. As already stated, pruning can also be performed at other levels of the memory hierarchy.

Figure 2:
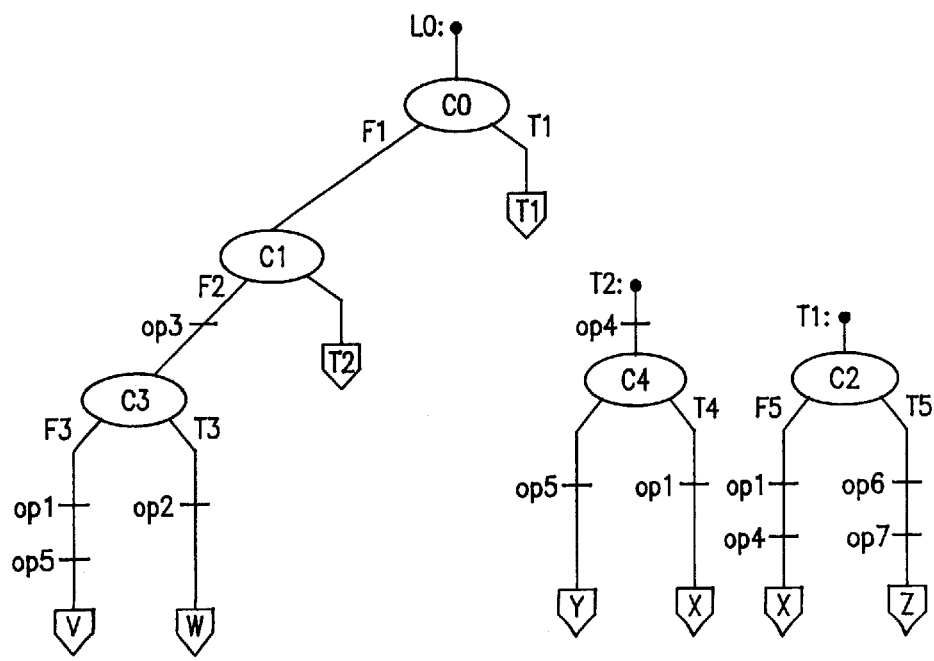
FIG. 2 is a diagram of the tree-instruction of FIG. 1 illustrating a pruning operation.

Pruning is possible because the operations in the paths of the tree are subject to sequential semantics. Consequently, it is possible to replace any outgoing arc from an internal node by a leaf whose destination target corresponds to the part of the tree which is being pruned. For example, assume that the tree-instruction in FIG. 1 is to be transformed into trees having at most four leaves (i.e., four destination targets). As shown in FIG. 2, the original tree instruction is transformed by pruning at the arcs labeled T1 and T2, which generates three trees; one having four destination targets, and two having just two destination targets.

Since operations on the pruned portions of the tree are independent from the ones in the corresponding paths of the previous portion of the tree-instruction, they can be executed after the previous part of the tree has been executed (i.e., in the next execution cycle) without problems. In terms of the sequential representation, pruning implies replacing the corresponding skip instructions by conditional branch instructions, as indicated by the following table for the case of chunk size of one word (conditional branch instructions replacing the skip instructions are shown in boldface):

```
L0:   skip if (C0) to T1        L0:   branch if (C0) to T1
F1:   skip if (C1) to T2        F1:   branch if (C1) to T2
F2:   op3                       F2:   op3
      skip if (C3) to T3              skip if (C3) to T3
F3:   op1                       F3:   op1
      op5                             op5
      branch V                        branch V
T3:   op2                       T3:   op2
      branch W                        branch W
T2:   op4                 ==>   T2:   op4
      skip if (C4) to T4              skip if (C4) to T4
F4:   op5                       F4:   op5
      branch Y                        branch Y
T4:   op1                       T4:   op1
      branch X                        branch X
T1:   skip if (C2) to T5        T1:   skip if (C2) to T5
F5:   op1                       F5:   op1
      op4                             op4
      branch X                        branch X
T5:   op6                       T5:   op6
      op7                             op7
      branch Z                        branch Z
```

Note that, in the resulting sequential representation, the instructions labeled T2 and T1 follow an unconditional branch instruction and are not reachable by a skip instruction from the preceding tree-instruction, so they correspond to the starting point of independent trees.

In the context of this invention, it is expected that a VLIW compiler (programmer) will place the most-likely execution path of a tree-instruction as the leftmost path; this means that the most-likely path appears as a contiguous set of primitive operations in the sequential representation of the tree in memory. As a result, in most executions a pruned tree-instruction might exhibit the same execution time as the original tree-instruction, because the executed part might be fully contained in the first VLIW obtained after pruning. The operations in the other portions of the original tree-instruction correspond to speculative primitive instructions which would have been dispatched if there were sufficient computing resources in the processor. Thus, the invention provides a run-time mechanism to reduce the degree of speculation depending on the computing resources available in an implementation.

Consider now the case of a tree-instruction that needs to be pruned because it exceeds the maximum number of resources of some type (for instance, arithmetic-logic units) available in an implementation. For example, assume that the tree-instruction shown in FIG. 1 needs to be decomposed so that it can be executed by a processor that accepts a maximum of six primitive operations per VLIW, and whose chunk size is one word. In such a case, the arcs labeled T4 and T1 are replaced by branches, so that the corresponding instructions become the first operation of new trees. That is, the original tree-instruction is decomposed into three trees, the first one having six arithmetic/logic operations, the second one having one, and the last one having four of such operations.

The decomposition of a tree-instruction as described above preserves the number of operations (including skip and branches) across the original and decomposed tree-instructions. In other words, the decomposition has serialized the execution of the tree but has not changed the total number of operations required and, therefore, has not changed the number of memory words needed to represent the decomposed version. The underlying assumption is that all the primitive operations that appear on one arc of the complex tree also appear together in a simpler tree, so that pruning is performed at skip instructions. However, if this is not possible or convenient due to lack of resources (that is, there are more operations in one arc than the maximum degree of parallel execution available in an implementation), then a complex tree instruction can be decomposed by adding an extra implicit unconditional branch instruction at the end of one chunk and whose target address is the memory address of the next sequential chunk, effectively splitting a particular arc into two arcs. Moreover, when the decomposition is carried out at I-cache replacement time, the space required to encode this unconditional branch is needed only inside the I-cache but not in the representation of the program in main memory. Furthermore, since the target destination of this branch is the next sequential chunk address, it can be encoded with just a single bit.

Conventional scalar and superscalar processors can directly execute the sequential representation of tree-instructions because there are no special requirements imposed by this representation. Thus, a compiler can perform code optimizations which deliver good performance on a VLIW implementation without degrading the performance achieved when the same program is executed in a scalar or superscalar implementation. That is, the generation of code in the form of trees tuned for a VLIW implementation achieves object-code compatibility with scalar and superscalar implementations of the same architecture.

Tree-instructions are preferably translated into VLIWs at I-cache reload time. Ideally, the VLIWS in the I-cache correspond to tree-instructions whose execution requirements match the parallel execution capabilities of the VLIW processor. This requires that larger tree-instructions be decomposed into simpler ones, and smaller trees would have to be filled with no-op operations. However, in order to maintain one-to-one correspondence among operations in main memory and operations in I-cache (thus preserving the features of tree-instructions discussed earlier), the I-cache must be capable of holding variable-length VLIWs whose maximum size matches the parallel execution capabilities of the VLIW processor. Moreover, I-cache lines must be able to contain more than one such VLIWS. For these purposes, I-cache lines are either augmented with extra bits which encode information such as the size and location of each VLIW within the I-cache line, the number and type of chunks per VLIW, and the like, or the contents of the VLIW are encoded in a tighter format which leaves space for the extra information. All such information is extracted from the trees at I-cache reload time. That is, at I-cache reload time, tree-instructions are translated into variable-length VLIWs whose maximum size matches the capabilities of the VLIW processor. Small trees are translated into small VLIWs without expansion. Additional information is added in the I-cache lines, which identify the starting and ending position of VLIWS within the lines. At I-cache access time, the memory address is used to extract from the corresponding I-cache line the variable-length VLIW starting at that address. This VLIW is either expanded to match the capabilities of the VLIW processor, or is fetched from the I-cache together with other operations beyond the end of the VLIW which are disabled from execution by the generation of execution masks. The expansion/disabling is achieved using the information encoded in the same I-cache line.

The translation process uses the following assumptions and must perform the following tasks, the details of which are determined by the specific implementations.

Assumptions:

Main memory is divided into main memory blocks, whose size is implementation dependent but is a multiple of the chunk size.

In addition to the destination targets explicitly specified in a tree-instruction, the translation logic can insert unconditional branch instructions whose destination is the memory address of the next sequential chunk. Such branch instructions are encoded in separate bits within the VLIW.

Each tree-instruction is fully contained within a main memory block but may start at any chunk boundary within the block. The first word in a block always corresponds to the first operation in a tree-instruction (i.e., trees may not straddle a block). Additional trees may be contained in the block.

If the last instruction in a main memory block is not the end of a tree, an implicit branch to the next sequential memory address is assured (effectively splitting the tree into two).

Figure 3:
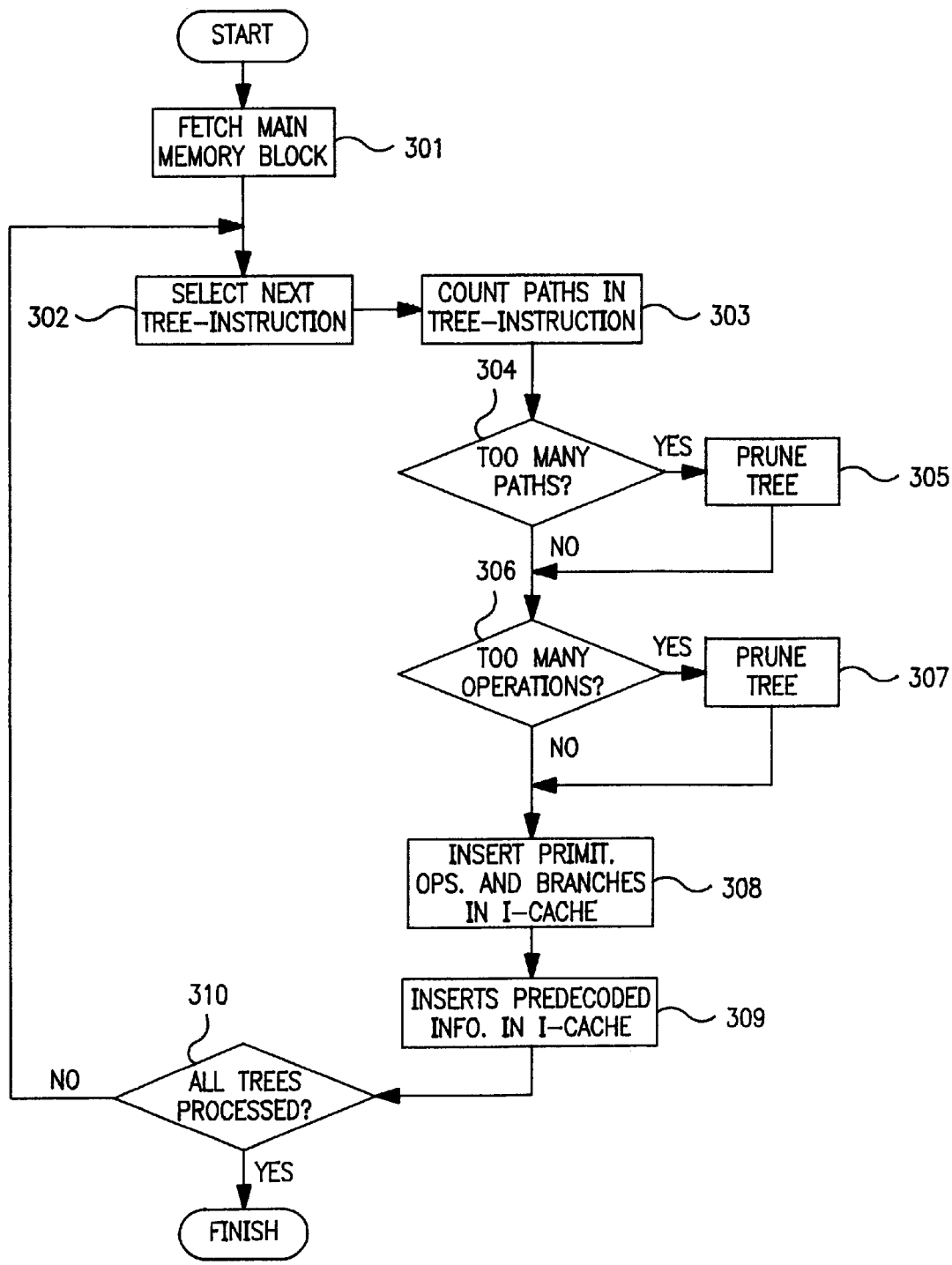
FIG. 3 is a flow diagram showing the logic of the translation process according to the invention.

The translation process is illustrated in the flow diagram of FIG. 3, to which reference is now made. In function block 301 a memory block is fetched from main memory. Starting at the first chunk in the block, the first tree-instruction is selected in function block 302. In function block 303, the number of paths in the corresponding multiway branch is determined from the skip instructions. Each skip operation originates an additional path, and each path ends with an unconditional branch instruction. A test is made in decision block 304 to determine if the number of paths in the tree-instruction exceeds the multiway branch capabilities of the processor. If so, the skip instructions whose targets are farthest away are replaced in function block 305 by branch instructions with the same destination target, leaving only as many tree-paths as the implementation allows. In other words, the corresponding tree is pruned. A further test is made in decision block 306 to determine if the number of chunks exceeds the computing capabilities of the processor, either in the entire tree or in a particular tree-path. If so, the tree is pruned in function block 307 by replacing the skip instructions, whose target is beyond the instruction where the number of resources is exceeded, by branch instructions with the same destination target. In addition, the tree-path containing the operations where the number of resources is exceeded is broken at a chunk boundary into different VLIWS, by inserting an implicit unconditional branch to the next sequential chunk. Then, in function block 308, the primitive operations and branches collected while traversing the tree-instruction are inserted into the I-cache line, in the form of a VLIW. Any pre-decoded information regarding the VLIW, as required by a specific implementation, is inserted in function block 309. A test is made in decision block 310 to determine if there are chunks in the memory block not yet assigned to VLIWS. If so, the process loops back to function block 302 to repeat itself until all chunks in the memory block have been assigned to VLIWS. When all chunks have been assigned, the process ends.

Figures 4, 5:
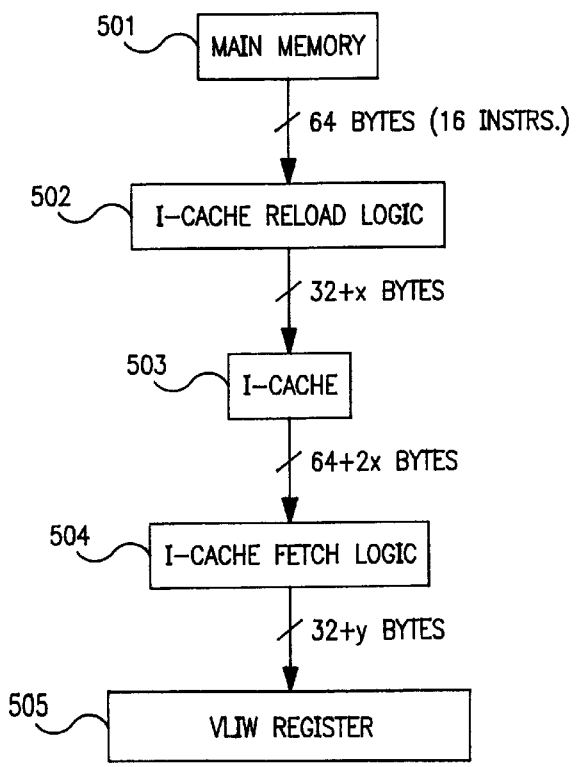
FIG. 4 is a memory map showing variable-length VLIWs in the instruction cache.
FIG. 5 is a block diagram of a VLIW processing system according to the present invention.

The translation process is illustrated by way of example. For the purposes of the example, consider the tree-instruction listed in the first table which must be translated into variable length VLIWs to be stored in an I-cache with lines of length eight words; as stated earlier, this representation of the program assumes a chunk size of one word and primitive operations also of one word. The tree-instruction starts at label L0 and consists of twenty-two operations (twenty-two chunks). Furthermore, assume that the processor is capable of executing a four-way branch and four primitive operations per VLIW, so that the maximum size of the variable length VLIWs is four branches and four operations. Assume as well that VLIWs can straddle the boundaries of an I-cache line; that is, a VLIW may start at one I-cache line and end in the next line. The outcome of the translation process is as depicted in FIG. 4. The tree-instruction is decomposed into four variable-length VLIWs, as indicated by the heavy lines in FIG. 4, some VLIWs straddle the I-cache line boundaries, and some of the skip instructions have been replaced by branches. The first VLIW (labeled L0) contains four branches and three operations. The VLIW labeled T3 consists of just one operation and a branch. The VLIW labeled T2 specifies two branches, one skip instruction and three operations. The VLIW labeled T1 contains one skip, two branches and four primitive operations. Additional bits (not shown in FIG. 4) specify the boundaries of the variable-length VLIWs within the I-cache line, as well as the location of primitive operations and branches within the line. Furthermore, additional bits (not shown in FIG. 4 either) or a tighter encoding of the operations may be used to provide a predecoded representation of the VLIWs, as well as to implement the mechanism to expand shorter VLIWs or disable operations in the same I-cache line not belonging to a VLIW fetched for execution.

If an implementation does not allow splitting a VLIW across two I-cache lines as assumed in the example above, the translation process would insert implicit branches at the end of the cache lines containing partial VLIWs (branches to the next sequential chunk, using the mechanism described above). Such smaller VLIWs would then be executed sequentially.

The overall structure of a VLIW processor system, which uses the features described in this invention and performs the transformation of tree-instructions into VLIWs at I-cache replacement time, is depicted in FIG. 5; this figure shows in block diagram form the path from main memory 501 to the VLIW processor 507. By way of example, assume that main memory blocks are 32 words long (128 bytes) so that the maximum size of a tree is 32 operations; assume as well that the processor is capable of executing a four-way branch and four operations per VLIW. Moreover, assume the I-cache reload logic 502 fetches main memory blocks at a rate of 16 words (64 bytes) per access (e.g., a main memory block access requires two accesses) and generates I-cache lines of 32+x bytes. The base 32 bytes contain eight operations, whereas the extra bytes contain the additional information extracted from the trees regarding the variable-length VLIWs, such as the number and position of the variable-length VLIWs, the location of operations and branches, and the location of implicit branches. On the other side of the I-cache 503, the fetch logic 504 accesses 64+2x bytes, and extracts 32+y bytes which are delivered to the VLIW register 505 of the processor for execution. The base 32 bytes contain four branches and four primitive operations, potentially including no-ops in the case of incomplete VLIWs, aligned as required by the position of the functional units within the processor. The extra bytes are used for a pre-decoded representation of the VLIW contents which simplify its execution, if that is advantageous. The number of extra bits generated by the I-cache reload logic 502 and I-cache access logic 504 (values of x and y, respectively) are determined by the features of a particular VLIW processor implementation. Alternatively, instead of including no-ops in the case of incomplete VLIWs, the I-cache fetch logic could extract eight adjacent operations even if they belong to different VLIWs, and generate an execution mask indicating the end of the VLIW. Furthermore, in the case of a predecoded representation of the VLIW, the I-cache logic could generate an execution mask indicating the location of the different tree-paths within the VLIW, so that the determination of which operations belong to the taken path is simplified.

A chunk size equal to one memory word, as used in the example above, may originate stringent implementation requirements, in particular regarding the alignment of VLIWs in the I-cache with respect to the VLIW register. These requirements may be reduced by using a larger chunk size, at the cost of some memory space due to the introduction of no-op operations to align the tree-instructions with the chunk boundaries. These tradeoffs are specific to each particular architecture implementing this invention.

B. An Example of Computer Processing Unit that Embodies the Present Invention

Figure 6:
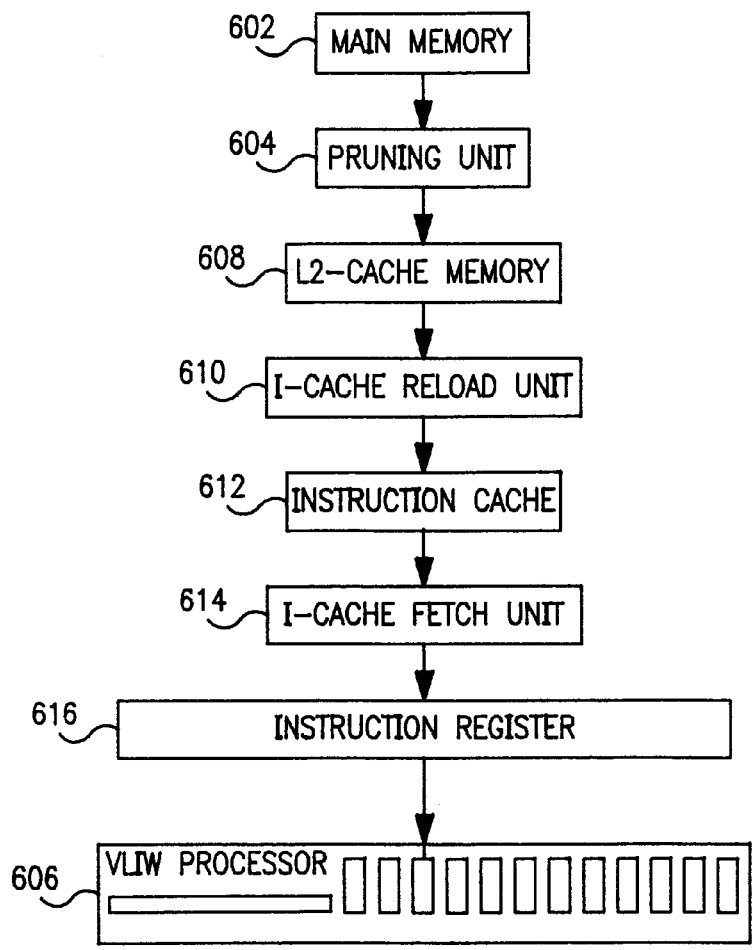
FIG. 6 is a block diagram of a VLIW processing system embodying the present invention.

This invention may be embodied in any processor family capable of executing tree-instructions, including VLIW implementations. An example of a VLIW processing system that embodies the present invention is shown in FIG. 6, in which the transformation of tree-instructions into VLIWs is performed in several steps in the path from main memory to the processor. In particular, tree-instructions are pruned while being brought into a second level of cache memory (L2-cache), and are formatted as pre-decoded variable-length VLIWs in the instruction cache (I-cache). The pre-decoded VLIWs include information which simplifies the final decoding and execution in the fixed-length VLIW processor.

For the sake of description, consider an example wherein the chunk size is four memory words (128 bits), so that chunk and quadword may be used interchangeably. Furthermore, assume that each primitive instruction occupies a single memory word. Thus, a chunk contains four primitive instructions.

This example VLIW processor system includes a main memory 602 that stores a set of tree-instructions including, for example, the tree-instruction depicted above with respect to FIG. 1 and the accompanying table (but with chunk size of four words). A pruning unit 604 fetches tree-instructions from the main memory 602, transforms large tree-instructions into variable-length VLIWs which can be executed with the resources available in the processor unit 606, and stores them in a L2-cache memory 608. This transformation occurs whenever the processor attempts to access a VLIW which is not found in the L2-cache, being necessary to replace a block of the L2-cache with the main memory block containing the requested VLIW. An instruction cache reload unit 610 fetches variable-length VLIWs from the L2-cache memory 608, and places a pre-decoded form of such VLIWs into an instruction cache 612. This transformation occurs whenever the processor attempts to access a VLIW which is not found in the instruction cache, being necessary to replace a block of the I-cache with the block from the L2-cache containing the requested VLIW. An I-cache fetch unit 614 transfers one pre-decoded VLIW from the instruction cache 612 to an instruction register 616 whenever the processor attempts to access a VLIW. The I-cache fetch unit 614 arranges the chunks contained in the predecoded VLIW fetched from the instruction cache 612 before transferring such predecoded VLIW to the instruction register 616. The fetched VLIW is extended with adjacent primitive instructions whenever the size of the VLIW is smaller than the size of the instruction register 616; the predecoded information contained in the VLIW indicates its actual length.

The VLIW stored in the instruction register 616 is then transferred to the processing unit 606 for execution. Typically, the processing unit contains a plurality of functional units that execute in parallel all the primitives contained in the given VLIW. For example, the functional units may include one or more fixed-point units which execute fixed-point primitive operations, one or more floating-point units which execute floating-point primitive operations, one or more load/store units which execute load/store primitive operations, and one branch processing unit which executes one or more conditional skip/branch instructions (i.e., internal nodes) and one unconditional branch instruction (i.e., leaf). Only those operations in the selected path within the VLIW are executed to completion; the branch unit determines which is the selected path and, using the predecoded information contained in the VLIW, controls which functional units complete the operations being executed.

The operation of the VLIW processing system of FIG. 6 according to a preferred embodiment of the present invention is now set forth. A program stored in the main memory 602 has the following characteristics:

each tree-instruction is stored in the main memory 602 at a chunk boundary;

the target of each skip instruction is stored in the main memory 602 at a chunk boundary;

unconditional branch instructions appear in the main memory 602 only as the last primitive instruction within a chunk; and whenever a tree-instruction does not contain the exact number of operations needed to align unconditional branch instructions or the targets of skip instructions in chunk boundaries, the tree-instruction is stored in the main memory 602 expanded with as many no-op operations as required to achieve such an alignment.

Figure 7:
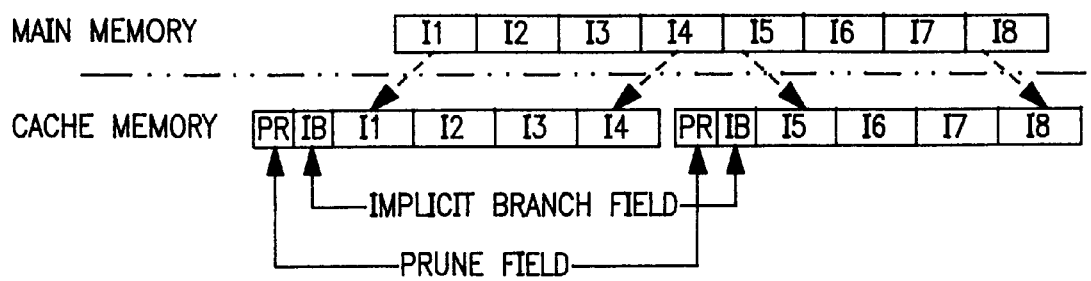
FIG. 7 is a pictorial representation of the format of a tree-instruction stored in the main memory of FIG. 6 prior to pruning, and the format of a pruned tree-instruction stored in the L2-cache memory of FIG. 6 after pruning.

The pruning unit 604 fetches tree-instructions from the main memory 602, transforms large tree-instructions into variable-length VLIWs which can be executed with the resources available in the processor unit 606, and stores these VLIWs in the L2-cache memory 608. An example of the format which may be used to represent VLIWs stored in the L2-cache memory 608 is shown in FIG. 7 and consists of:

the contents of the chunks (I1,I2, . . . ) fetched from main memory 602;

a 4-bit field per chunk (PR) identifying skip instructions within the chunk that have become pruning points, so that such skip instructions can be interpreted as conditional branch instructions (instead of skip instructions); and a single-bit field per chunk (IB) indicating if an implicit branch has been inserted at the end of the chunk.

Note that each chunk is augmented with the two fields listed above, so that the variable-length VLIW (or pruned tree-instruction) still corresponds to a set of chunks, although the size of the new chunks is five bits larger. The number of extra bits required is determined by the size of the chunk (one bit per primitive instruction contained in the chunk plus one). Consequently, this representation requires that the cache memory used to store the VLIWs has five extra bits per chunk. Alternatively, the representation of the tree-instructions in main memory could be restricted to define some bits per chunk as reserved so those bits would be available for the augmented representation.

The pruning unit 604 preferably implements the algorithm set forth below:

```
Begin Main( )
    NoPaths:=1;
    For i:=1 to MaxOps Loop
        Instr(i):= decode(Parcel(i));
        Case (Instr(i)) is
            when skip     =>  NoPaths     :=NoPaths+1;
            when branch   =>  NoBranches  :=NoBranches+1;
            when classA   =>  NoClassA:=NoClassA+1;
            when classB   =>  NoClassB:=NoClassB+1;
            . . .
        End Case;
        If (NoPaths > MaxPaths) then         # check for too
                                               too many paths
            NoPaths:= MaxPaths
            Prune( );
        Elsif (NoClassA > MaxClassA)  then  # check for too
                                              many ops A
            Prune ( );
        Elsif (NoClassB > MaxClassB)  then  # check for too
                                              many ops B
            Prune( );
        Elsif (NoPaths = NoBranches)  then  # check if end of
                                              tree
            PruneRest( );
        End If;
    End Loop;
    i:= MaxOps+1;
    Prune( );
End Main;
Begin Prune( )
    t:= i-(i mod 4);
    If (Instr(i) /= Branch) then
        IB(t):= 1;                          # set implicit branch
        NoBranches:= NoBranches+1;
    End If;
    diff:= NoPaths-NoBranches;
    k:= 0;
    For j:=1 to diff Loop
        k:= k+1;
        While (Instr(k) /= skip) then
            k:= k+1;
        End While                           # set pruning bit
    End Loop;
End Prune;
Begin PruneRest( )
    For j:=i to MaxOps Loop
        PR(j):= 1;                          # see pruning bit
    End Loop;
End PruneRest;
```

As described by this algorithm, the pruning unit 604 examines one chunk at a time, checking for availability of the resources required by the chunk. The unit counts the number of paths in the multiway branch and the number of operations in the tree (or in each class of operations for the case of independent limits for each type of resource such as fixed-point units, floating-point units, etc.). If any of the resources is exceeded (paths or operations), the pruning unit 604 prunes the tree at the chunk prior to the one where the resources are exceeded.

The pruning unit 604 generates the four-bit field per chunk (PR) indicating whether the tree-instruction has been pruned at any of the skip instructions contained within a given chunk (by transforming the skip instruction into a conditional branch instruction), and the single bit-field per chunk (IB) indicating whether the tree-instruction has been pruned at the end of a given chunk (by inserting an implicit branch). The single-bit field IB is set to 1 (an implicit branch is inserted) whenever the last instruction in the chunk prior to the one where the resources are exceeded is not an unconditional branch. A bit in field PR is set to 1 (the corresponding skip instruction is transformed into a conditional branch instruction) whenever the target of the skip instruction has not yet been encountered when the resources are exceeded. Since targets of skips appear in memory in a last-to-first manner (i.e., the target of the later skip is encountered before an earlier skip), as many bits in PR are set to 1 as the difference between the number of paths and the number of unconditional branches found in the tree-instruction.

The pseudo-code above corresponds to decoding and checking one instruction a time, although the extension to process multiple instructions at once is direct. For each skip instruction, the mechanism increments the count of the number of paths in the tree-instruction; when this count exceeds the number of paths that can be executed by the processor, the unit prunes the tree-instruction by:

setting an implicit branch at the end of the chunk prior to the one where the resource limit is exceeded, if that instruction is not an unconditional branch; and marking each of the skip instructions whose targets have not yet been processed. The mark consists of setting to 1 the bit in field PR associated to the position of the skip instruction within the chunk.

To illustrate the operation of the pruning unit 604, consider for example the tree-instruction described earlier with respect to FIG. 1, which is shown below for the case of chunk size equal to four words and which includes the alignment of skip targets and branch instructions indicated above:

```
L0:   skip if (C0) to T1
F1:   skip if (C1) to T2
F2:   op3
      skip if (C3) to T3
F3:   op1
      op5
      nop
      branch V
T3:   op2
      nop
      nop
      branch W
T2:   op4
      skip if (C4) to T4
F4:   op5
      branch Y
T4:   op1
      nop
```

-continued

```
      nop
      branch X
T1:   skip if (C2) to T5
F5:   op1
      op4
      branch X
T5:   op6
      op7
      nop
      branch Z
```

Assume the processor implementation can execute at most a four-way branch. FIG. 2 depicts the variable-length VLIWs generated by the pruning unit 604 in this case. More specifically, the original tree-instruction is pruned at the first two skip instructions, generating three tree-instructions: the first one is a four-way tree, whereas the other two correspond to two-way tree-instructions starting at labels T1 and T2, respectively.

Figure 8:
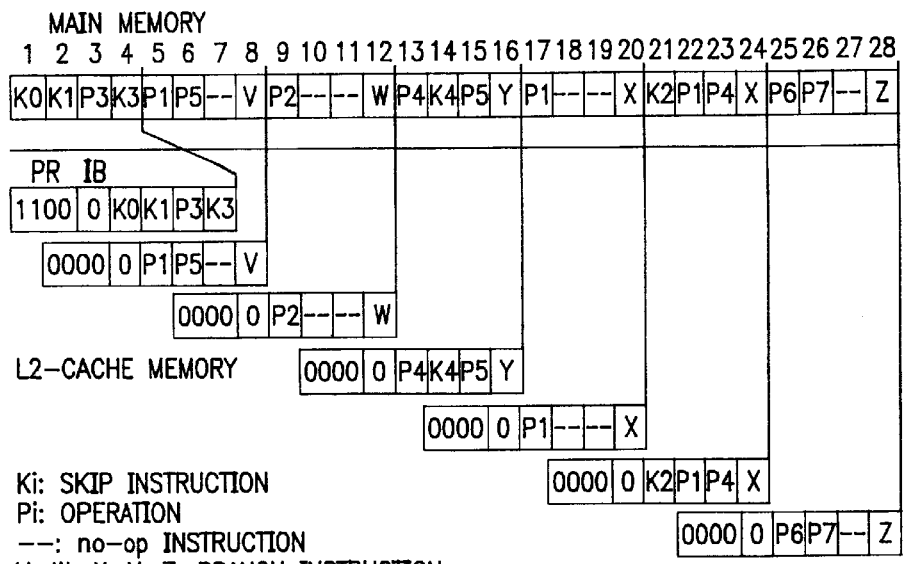
FIG. 8 is a pictorial representation of the pruned tree-instructions of FIG. 2 stored in the L2-cache memory of FIG. 6.

FIG. 8 depicts the representation of the tree-instruction in the main memory 602 prior to pruning and the representation of the pruned tree-instructions in the L2-cache memory 608. As shown, the PR field of the first chunk has the leftmost two bits set to 1 to identify that the first two skip operations (labeled K0,K1) have become pruning points. All other PR bits are set to 0. There are no implicit branches inserted in this case.

Figure 9:
FIG. 9 is a pictorial representation of the format of a pre-decoded representation of the pruned tree-instruction stored in the instruction cache memory of FIG. 6.

The I-cache reload unit 610 fetches pruned tree-instructions from the L2-cache memory 608 and places a pre-decoded form of such instructions in the instruction cache 612. An example of the format which may be used to represent the predecoded instructions stored in the I-cache 612 is shown in FIG. 9 and consists of:

the contents of the chunks (I1, I2 . . . ) fetched from the L2-cache memory 608;

fields PR and IB per chunk fetched from the L2-cache memory;

a c-bit field (BC) per chunk containing the conditions tested by the skip instructions in the chunk;

a t-bit field (BT) per chunk containing the target of the unconditional branch or the target of the implicit branch in the chunk, if any;

a 4-bit field (SK) per chunk indicating the position of skip instructions within the chunk; and a single-bit field (BR) per chunk indicating whether the last operation in a chunk is an unconditional branch.

In this case, the structure of the instruction cache 612 must be able to hold these augmented chunks, whose size is larger than the one in the L2-cache memory 608. Fields BC and BT contain redundant information (their contents are part of the instructions in the chunk); the objective of this replication is to simplify the formation of VLIWs at instruction cache fetch time, if that is advantageous. Such a replication is an optional feature; these values can be extracted from the primitive instructions in the chunks.

Preferably, the I-cache reload unit 610 operates as follows for each of the chunks which the processor unit 606 can execute simultaneously (wherein k is the number of primitive instructions per chunk):

```
Begin Main( )
    For i:=1 to k Loop
        If (Instr(i) = skip) then
            BC(i):= Instr(i).Cond;
```

-continued

```
            SK(i):= 1;
          End If;
        End Loop;
    If (Instr(k) = branch) then
        BR:= 1;
        BT:= Instr(i).Target;
    Elsif (IB(k) = 1) then
        BT:= ChunkAddress + k;
    End If;
End Main;
```

Figure 10:
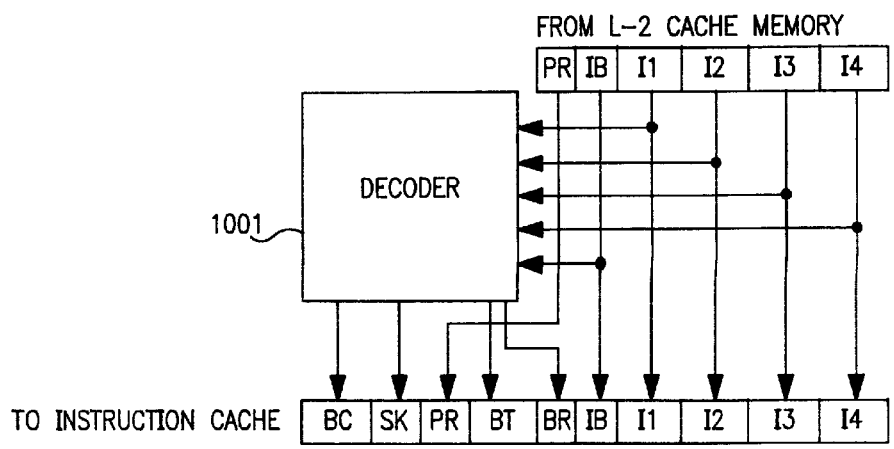
FIG. 10 is a block diagram of the instruction cache reload unit of FIG. 6.

Thus, for each of the chunks within a given pruned tree-instruction, the instruction cache reload unit 610 determines which instructions within the particular chunk are skip instructions, sets the bits in field SK corresponding to such skip instructions, and groups the conditions tested by such skip instructions into the BC field. The I-cache reload unit 610 also determines whether the last instruction in the chunk contains a branch, either explicit or implicit, copies the target address of such branch into field BT and sets the bit BR if the branch is explicit. Preferably, the instruction cache reload unit 610 includes a decoder 1001 as shown in FIG. 10 that performs such operations.

Figure 11:
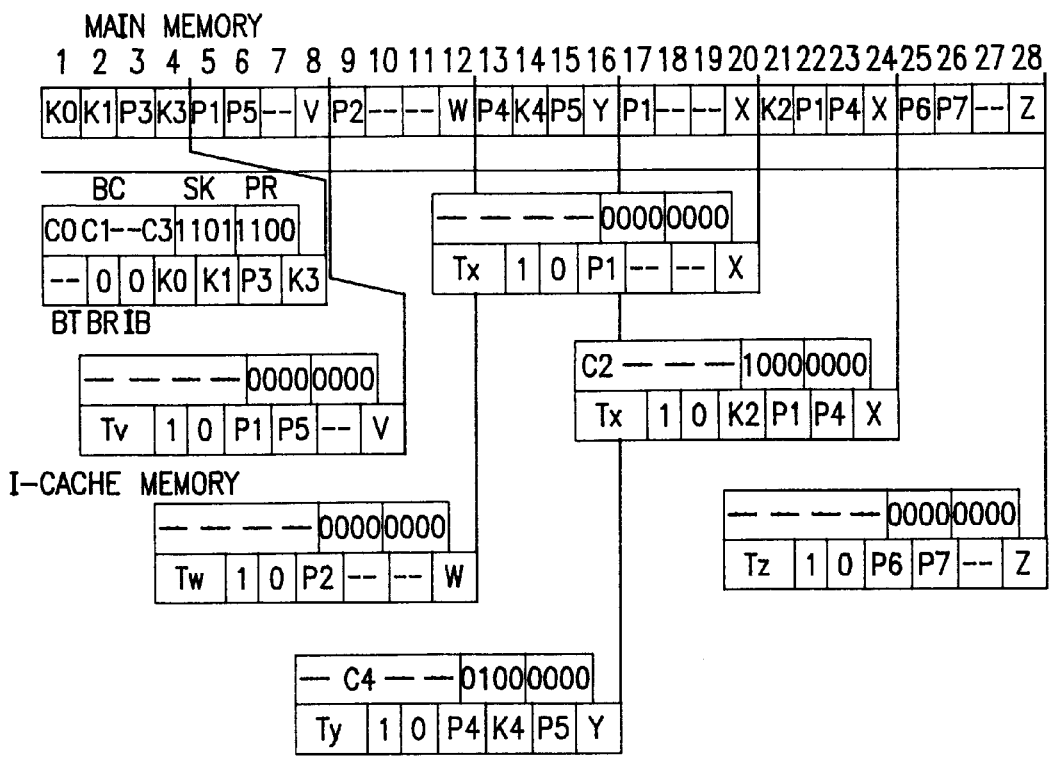
FIG. 11 is a pictorial representation of the format of the pre-decoded representation of the pruned tree-instruction of FIG. 8 as stored in the instruction cache memory of FIG. 6.

To illustrate the operation of the I-cache reload unit 610, consider the example tree-instruction described earlier with respect to FIG. 8. FIG. 11 depicts the representation in the instruction cache 61. For each chunk, fields are depicted with their corresponding values. As shown, for example, the first chunk (containing the primitive instructions, field PR and field IB) is augmented again. Field BC is set to the conditions tested by the skip instructions within the chunk; since there are three skips, three conditions appear in field BC. Correspondingly, field SK contains three bits set to 1, one for each skip instruction within the chunk. Field BR is set to 0, because there is no unconditional branch at the end of this chunk; correspondingly, the contents of field BT are undefined. In contrast, field BR in the second chunk is set to 1, and field BT in the second chunk is set to the value corresponding to the target VLIW labeled V.

Figure 12:
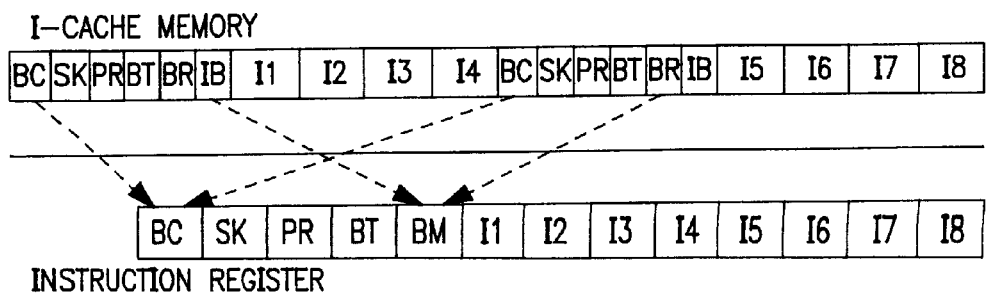
FIG. 12 is a pictorial representation of the format of the pre-decoded representation of the pruned tree-instruction stored in the instruction cache memory of FIG. 6, and the format of a VLIW derived from such pre-decoded representation as stored in the instruction register of FIG. 6.
Figure 13:
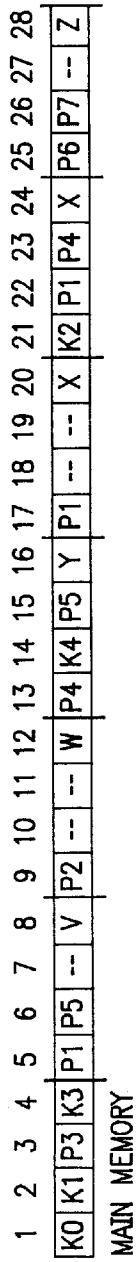
FIG. 13 is a pictorial representation of an example of the VLIWS derived from the pre-decoded representation of FIG. 12 as stored in the instruction register of FIG. 6.
Figure 13:
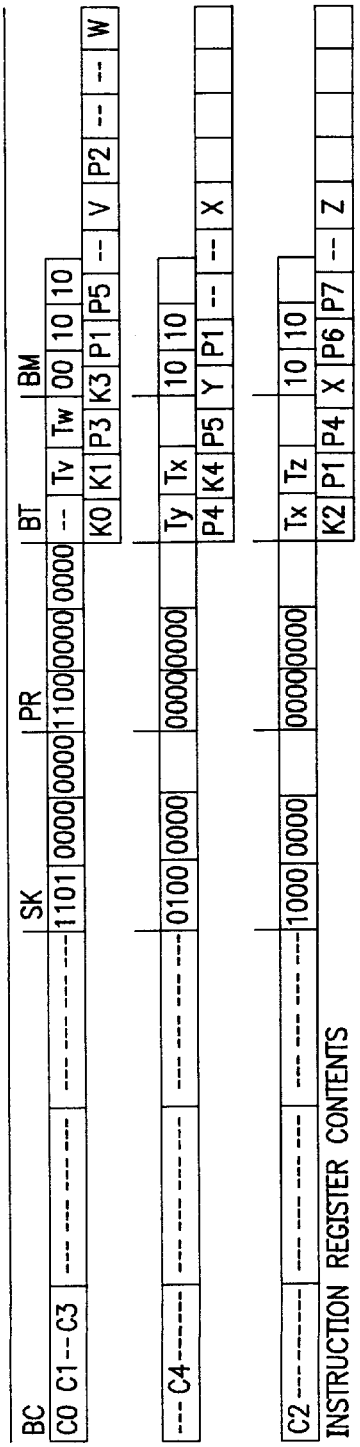

The I-cache fetch unit 614 composes a VLIW by fetching a group of augmented chunks from the instruction cache 612 and pooling together the related fields from the different chunks. The I-cache fetch unit 614 then transfers the VLIW to the instruction register 616 for execution by the processor unit 606. Pooling together the fields makes those elements readily available to the branch unit within the processor unit 606, which allows the branch unit to make a prompt identification of the selected path in the VLIW, and to fetch the next tree-instruction to be executed. An example of a format of the instruction register 616 is depicted in FIG. 12 and consists of:

- a field (BC) indicating all the conditions tested by the multiway branch;
- a field (SK) indicating the position of all the skip instructions within the VLIW;
- a field (PR) indicating all the points where the original tree-instruction was pruned;
- a field (BT) indicating the addresses of all branch targets referenced by the VLIW;
- a field (BM) indicating the position of all branches, explicit or implicit, within the VLIW; and
- fields (I1,I2 . . . ) indicating the operations composing the VLIW. The length of the VLIW and its special fields are implementation-dependent, because it is determined by the number of chunks fetched from the instruction cache; in turn, this limit is imposed by the width of the processor (the number of operations which the processor can execute in parallel). FIG. 13 depicts examples of the contents of the instruction register 616 corresponding to the tree-instructions in FIG. 2, assuming that the processor is capable of executing three chunks at a time. The first VLIW is exactly three chunks long, so the entire VLIW register is used; field BC contains the three conditions tested by this VLIW (C0,C1,C3); field SK indicates the position of the three skip instructions (all in the first chunk); field PR indicates the two pruning points (both in the first chunk); field BT indicates the targets of the two unconditional branches in this VLIW (namely, V and W in the second and third chunks, respectively); field BM indicates that the second and third chunks each contain an explicit branch, and there are no implicit branches. The remaining fields correspond to the original instructions in the tree.

In contrast, the remaining two VLIWs are only two chunks long, so the contents of the VLIW register depicted in FIG. 13 has some fields not specified. As it will be shown later, the VLIW register is loaded with adjacent chunks from the instruction cache, which belong to other VLIWs.

Figure 14:
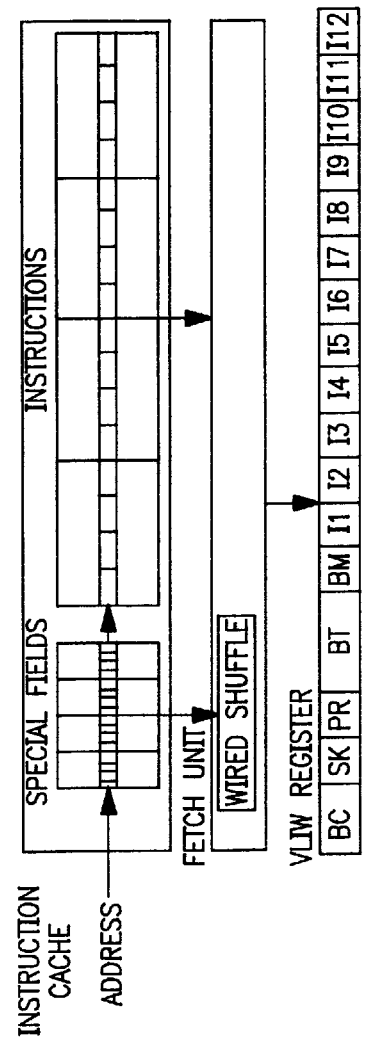
FIG. 14 is a block diagram illustrating the instruction cache memory, I-cache fetch unit and instruction register of FIG. 6.

The instruction cache 612 may be organized as multiple parallel banks, so that multiple chunks are simultaneously fetched from the L2-cache memory and stored in the instruction cache. In this case, the I-cache reload unit 610 preferably performs in parallel the operations associated with each of the chunks contained in the variable-length VLIW. Moreover, the instruction cache fetch unit 614 preferably fetches as many chunks from the instruction cache 612 as the processor can execute, and reorders the fields from the different chunks so that related fields are placed together in the VLIW register. Since the instruction cache is organized as multiple parallel banks which are accessed simultaneously, the access to such a cache is decomposed into two steps. First, an entire instruction cache line is selected, and then a "late-select" control is used to fetch the number of chunks required to fill the VLIW register. The instruction cache fetch unit 614 requires no logic in addition to the paths for accessing it as described above, because the process of placing together the fields from the different chunks consists only of wiring the connections properly, as inferred from FIG. 12. Note that only the left-most portion of the chunks are shuffled while being formatted; the primitive instructions are just concatenated. This fact can be exploited to avoid long wires in the implementation of the processor, by storing the special fields from the chunks in different banks than those containing the associated instructions but accessing them at the same time, as depicted in FIG. 14; in this way, shuffling is limited only to the region of the processor containing those banks.

Figure 15:
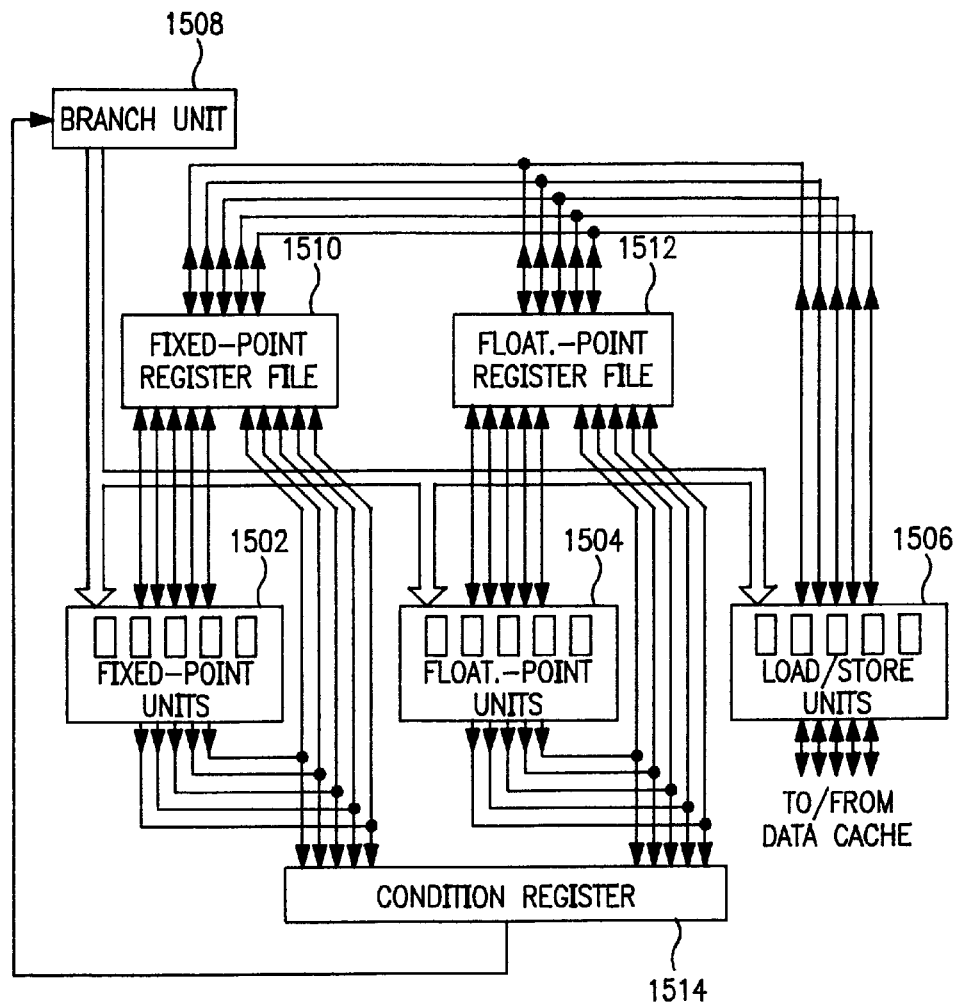
FIG. 15 is a block diagram of the processor unit of FIG. 6.

FIG. 15 depicts a block diagram of the processor unit 606, which consists as a minimum of a plurality of functional units (fixed-point units 1502, floating-point units 1504, load/store units 1506), a branch unit 1508, a multiport fixed-point register file 1510, a multiport floating-point register file 1512, and a conditions register 1514. The operation of the functional units 1502, 1504 and 1506 is controlled by the branch unit 1508. The fixed-point functional units 1502 receive data from the fixed-point register file 1510, and store results in the same register file as well as in the conditions register 1514. The floating-point units 1504 receive data from the floating-point register file 1512, and store results in the same register file as well as in the conditions register 1514. The load/store units transfer data to/from a data cache memory from/to the fixed-point and floating-point register files 1510 and 1512.

The execution of a VLIW contained in the instruction register 616 by the processor unit 606 (a VLIW instruction cycle) consists of the following tasks:

evaluation of the multiway branch specified in the VLIW, and identification of the selected path within the multiway branch;

execution of all the operations contained in the VLIW; and completion of all the operations in the selected path of the multiway branch, discarding the effects of all the operations in other paths, and fetching the VLIW which is the target of the selected path.

Figure 16:
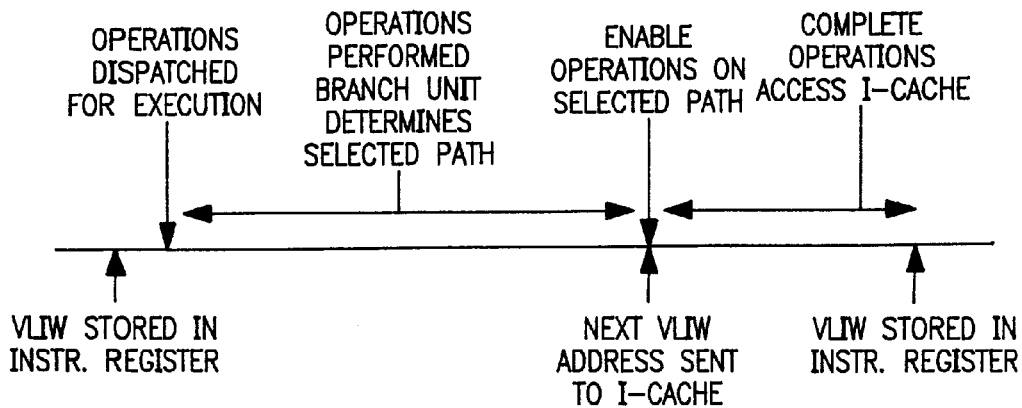
FIG. 16 is a pictorial representation of an instruction cycle of the processor unit of FIG. 15.

FIG. 16 is a timing diagram illustrating an instruction cycle of the processor unit 706. The instruction cycle starts when the VLIW to be executed is stored into the VLIW register. Then, all primitive operations contained in the VLIW are dispatched for execution in the functional units, whereas the multiway branch is dispatched for execution in the branch unit. The branch unit determines the selected path within the tree-instruction, then sends control signals to the functional units to enable those primitive operations which are in the selected path and therefore must commit their results (execute their operations to completion), and disable those not in the selected path. At the same time, the address of the next VLIW to be executed (the target VLIW in the selected path) is sent to the instruction cache, starting its access.

Depending on the specific implementation, the instruction cycle for two consecutive VLIWs may be overlapped to allow for a shorter cycle time. For example, the next VLIW to be executed may be predicted so that its access in the I-cache can be started before the selected path is identified. If the prediction is correct, then the instruction cycle can continue; otherwise, the correct VLIW must be fetched from the I-cache. Alternatively, the architecture may require that all possible targets of the same VLIW be stored in adjacent locations in the I-cache; in such a case, the access to the I-cache block containing all those targets is started instead of predicting the target VLIW, and a late-select control signal extracts the desired VLIW from the block.

Figure 17:
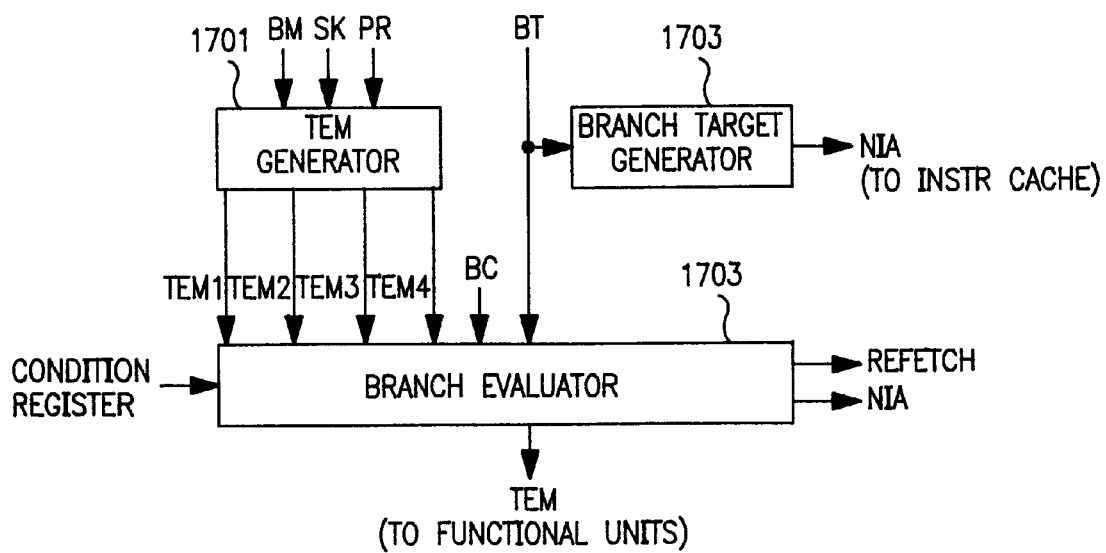
FIG. 17 is a block diagram of the branch unit of the processor unit of FIG. 15.

Preferably, as shown in FIG. 17, the branch unit includes a Target Execution Mask (TEM) Generator unit 1701, a Branch Evaluator unit 1703, and a Branch Target Generator unit 1705. The TEM Generator 1701 generates a sets of TEMs (TEM1, TEM2, TEM3, TEM4), each corresponding to a different execution path in the given VLIW. Each TEM indicates which operations within the VLIW should complete their execution by placing their results in the corresponding destinations, and which operations should be aborted (their results discarded). This mask specifies one bit per operation, which is used to activate the completion of the corresponding instruction. Preferably, the TEM Generator unit 1701 uses the following algorithm to generate the set of TEMs:

```
Begin Main( )
    i:= NextBit(BM);
    TEM(1):= GenTem1(i);
    For p:= 2 to LastPath Loop
        j:= NextBit(BM);
        k:= NextBit(SK);
        TEM(p):= GenTemN(k,i,j,TEM(p1));
        i:= j;
    End Loop;
    For p:= LastPath downto 1 Loop
        k:= NextBit(PR);
```

-continued

```
        If (k /= 0) then
            TEM(p):= PruneTem(TEM(p),k);
        Else
            exit;
        End If;
    End Loop;
End Main;
Begin GenTem1(t)
    For 1:= 1 to t Loop
        Mask(1):= 1;
    End Loop;
    BM(t):= 0;
    Return(Mask);
End GenTem1;
Begin GenTemN(skb,bmlst,bmnxt, TEMlst)
    For i:= bmnxt downto bmlst+1 Loop
        Mask(i):= 1;
    End Loop;
    BM(bmnxt):= 0;
    For i:= bmlst downto 1 Loop
        If (SK(i) = 1) then
            nxtsk:= i;
            exit;
        End If;
    End Loop;
    For i:=nxtsk downto 1 Loop
        Mask(i):= TEMlst(i);
    End Loop;
    SK(nxtsk):= 0;
End GenTemN;
Begin PruneTEM(nxtTEM,k)
    For i:= k+1 to Lastbit Loop
        nxtTEM(i):= 0;
    End Loop;
End PruneTEM;
```

Basically, the TEM Generation unit uses the information in fields SK, BM, and PR from the VLIW to determine the chunks corresponding to each path in the multiway branch. Note that a chunk may be part of more than one path. TEMs are associated left-to-right with paths in the multiway branch; consequently, TEM1 corresponds to the left-most path, TEM2 to the next one, and so on. TEM1 has bits set to 1 starting from the left end of the VLIW, up to the first branch instruction; this path corresponds to skip instructions not taken (the "fall-through" path). Since every path starts from the root of the tree-instruction, all remaining TEMs will use a portion of TEM1 (up to the corresponding skip instruction) and some other chunks within the tree. Each path ends at the end of a chunk (because unconditional branch instructions may appear only as the last instruction in a chunk).

The generation of TEM1 requires finding the position of the first branch instruction in the VLIW, which is determined from field BR; all bits in TEM1 from its left-end up to the position of the first branch are set to 1, whereas all remaining bits are set to 0. The other TEMs have the following characteristics:

bits after the position of the last branch instruction already identified and up to the position of the next branch instruction are set to 1; they represent the part of the VLIW corresponding to the target of the last skip instruction whose target has not been found yet;

bits after the position of the last skip instruction whose target has not been found yet and up to the position of the last branch instruction already identified are set to 0; they represent the part of the VLIW corresponding to paths already processed; and bits from the left-end and up to the position of the skip instruction selected above are set the same as the last TEM generated; they correspond to the portion of the VLIW which is common to this path and the previous one.

TEMs generated as described above do not yet take into account whether the tree-instruction has been pruned; in other words, these TEMs correspond to non-pruned trees. The effect of pruning is incorporated by recognizing that a path which has been pruned ends at the pruning point. Therefore, all bits in the TEM after the position of a bit set to 1 in PR must be set to 0. The relationship among bits set to 1 in PR and TEMs is in reverse order; that is, the left-most bit set in PR corresponds to the last TEM, the next PR bit set corresponds to the TEM before the last one, and so on.

Figure 18:
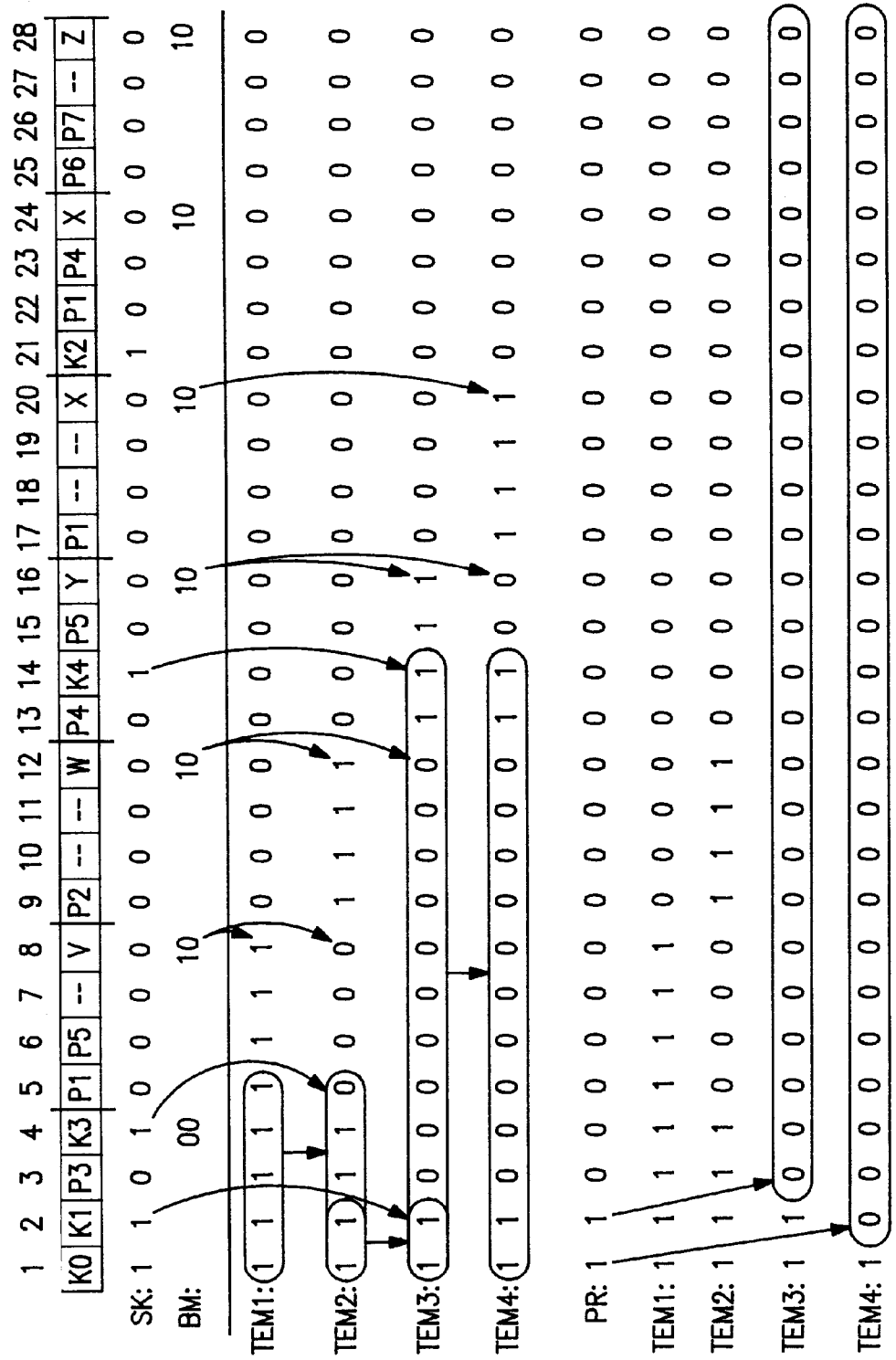
FIG. 18 is pictorial representation illustrating the operation of the TEM Generator unit of FIG. 17 in processing the first VLIW of FIG. 13.

FIG. 18 illustrates the mechanism used by the TEM generation unit, and the TEMs generated for the first VLIW shown in FIG. 13, under the assumption that the processor can execute at most a four-way branch instruction and seven chunks (that is, all operations in the entire tree-instruction could have been executed simultaneously if there were only four paths). As a result, the instruction cache fetch mechanism loads seven chunks into the VLIW register. Since the tree-instruction has been pruned, the seven chunks correspond to the desired VLIW as well as some instructions in the adjacent VLIWs. The TEM generation unit performs the functionality described above, first generating TEMs as if all chunks correspond to a single VLIW. Then, the information in field PR is used to set to 0 the TEM bits beyond the pruning points. The resulting TEMs contain bits set to 1 only for instructions 1 to 12, which corresponds to those in the first VLIW. TEMs for the other VLIWs are generated in the same manner when those VLIWs are selected as target of this one.

With reference to FIG. 17, the Branch Evaluator 1703 determines which path is taken by comparing the contents of the Condition Register 1514 with the conditions specified in the BC field of the VLIW register, chooses the TEM that corresponds to the selected path from those generated by the TEM Generator 1701, and forwards the bits from the chosen TEM to the functional units (one bit per unit). Furthermore, the Branch Evaluator 1703 selects the address of the next VLIW to be executed.

Upon receiving the corresponding TEM bit, each functional unit either completes its operation by storing its result as specified by the primitive instruction if the TEM bit is set to 1, or simply discards the result by not storing it if the TEM bit is set to 0.

The operation of the Branch Target Generator 1705 may be very simple. For example, depending on compiler conventions, this unit may always predict that the left-most path of the multiway branch will be taken, and initiate the access from the corresponding address. Other schemes can be easily used for these purposes, such as requiring that all targets of a VLIW are stored in adjacent locations in memory so that the selection of the actual target is accomplished as a "late select" from a cache block which is always predicted correct.

While the invention has been described in terms of a single preferred embodiment, those skilled in the art will recognize that the invention can be practiced with modification within the spirit and scope of the appended claims.

Having thus described my invention, what I claim and desire to secure by Letters Patent is as follows:

1. A method of executing a program, said method comprising the steps of:
   constructing a program as a set of variable length tree-instructions, each given tree-instruction comprising a sequence of primitive instructions including at least one execution path which are subject to sequential semantics, wherein each execution path starting at a first primitive instruction of said sequence of primitive instructions for said given tree-instruction and terminating at an unconditional branch instruction to a target instruction outside of said tree-instruction;
   storing said program in memory, wherein, for each given tree-instruction, said sequence of primitive instructions for said given tree-instruction are stored in consecutive memory locations;
   accessing said memory to fetch a memory block;
   decomposing portions of at least one tree-instruction stored in said memory block into a plurality of variable length intermediate instructions according to resources of a processor;
   executing said variable-length intermediate instructions in said processor.

2. The method recited in claim 1, further comprising the step of:
   storing said variable length intermediate instructions in a high-speed buffer or cache for execution by said processor.

3. The method recited in claim 2, wherein said high speed buffer comprises a multi-level cache system.

4. The method recited in claim 1, wherein said processor is a very long instruction word (VLIW) processor including a VLIW register having a fixed-length, said method further comprising the steps of:
   fetching a variable-length intermediate instruction; and
   expanding and aligning said variable-length intermediate instruction to fit the fixed-length of the VLIW register.

5. The method of claim 1, wherein said memory block contains at least one complete tree-instruction, and said decomposing step decomposes said at least one complete tree-instruction.

6. The method of claim 1, wherein said memory block contains at least one incomplete tree-instruction, and said decomposing step inserts an implicit unconditional branch to the next sequential address that is to occur after the last primitive instruction for said incomplete tree-instruction.

7. The method of claim 1, wherein said sequence of primitive instructions for a given tree-instruction include multiple execution paths, whereby primitive conditional skip instructions that branch to primitive instructions within said tree-instruction spawn said execution paths, and whereby a sequential representation of said tree-instruction may be generated by traversing said execution paths in a depth first manner.

8. The method of claim 7, wherein said memory block contains at least one incomplete tree-instruction, and said decomposing step inserts into an implicit unconditional branch instruction to the next sequential address that is to occur after the last primitive instruction for said incomplete tree-instruction, and replaces any primitive conditional skip instruction to a location outside said memory block with a conditional branch instruction to said location outside said memory block.

9. A method of providing object-code compatibility among very long instruction word (VLIW) processors with different organizations, and compatibility with scalar and superscalar processors, by representing programs in an implementation-independent manner, said method comprising the steps of:
   storing in computer memory a program as a set of variable length tree-instructions, each given tree-instruction comprising a sequence of primitive instructions including at least one execution path which are subject to sequential semantics, wherein each execution path starting at a first primitive instruction of said sequence of primitive instructions for said given tree-instruction and terminating at an unconditional branch instruction to a target instruction outside of said tree-instruction; and introducing implementation-specific aspects of a computer processor into the program stored in computer memory as part of the instruction cache (I-cache) access, said logic performing a first set of tasks at I-cache reload time and a second-set of tasks at I-cache fetch time.

10. The method recited in claim 9 wherein the step of introducing implementation-specific aspects of the processor into the program comprises the steps of:

accessing said computer memory to fetch a memory block containing one or more tree-instructions, said tree-instructions are not allowed to straddle beyond the end of said memory block, and the tree-instruction straddling said memory block is regarded as terminated at the end of said memory block, and skip instructions whose target is outside said memory block are regarded as conditional branch instructions that terminate the corresponding execution paths; and decomposing each fetched tree-instruction into a plurality of intermediate instructions of variable length, according to the resources of a processor on which the program is to be executed.

11. The method recited in claim 10 wherein the process is a VLIW processor having a fixed-length VLIW register, further comprising the steps of:

writing the variable-length intermediate instructions in an instruction cache (I-cache) for fetching by said processor;

fetching a variable-length intermediate instruction from said I-cache; and expanding and aligning the fetched variable length intermediate instruction to fit the fixed-length VLIW register.

12. The method recited in claim 11 wherein each tree-instruction fetched by said processor is decomposed into a plurality of variable-length intermediate instructions utilizing the following steps:

determining the number of tree-paths in a corresponding multiway branch from skip instructions in the tree-instruction, each skip operation originating an additional path, and each path ending in an unconditional branch instruction or at the end of the memory block;

determining if the number of paths exceeds the resources of the processor; and if the number of paths exceeds the resources of the processor, replacing skip instructions whose target is farthest away by conditional branch instructions with the same target, leaving only as many paths as the implementation allows.

13. The method recited in claim 12 further comprising the steps of:

determining if the number of primitive operations in the fetched tree-instruction exceeds the number of functional units in the processor;

if the number of primitive operations in the fetched tree-instruction exceeds the number of functional units, replacing skip instructions whose target is beyond a primitive instruction where the number of resources is exceeded by conditional branch instructions with the same target; and breaking the path containing the operation where the number of resources is exceeded into different intermediate instructions by inserting an implicit unconditional branch to the next sequential address.

14. In a data processing system including a memory for storing a sequence of variable length tree-instructions, a method for executing said variable length tree-instructions comprising the steps of;

fetching from said memory a block containing at least one variable length tree-instruction, each given tree-instruction comprising a sequence of primitive instructions including at least one execution path which are subject to sequential semantics, wherein each execution path starting at a first primitive instruction of said sequence of primitive instructions for said given tree-instruction and terminating at an unconditional branch instruction to a target instruction outside of said tree-instruction;

decomposing portions of said at least one variable length tree-instruction fetched from said memory into a plurality of intermediate instructions according to resources of a processing engine;

storing said plurality of intermediate instructions in a high speed buffer; and executing said plurality of intermediate instructions stored in said high speed buffer in said processing engine.

15. The method of claim 14, wherein said high speed buffer is a multi-level cache system.

16. The method of claim 14, wherein said processing engine is a VLIW processor and each of said intermediate instructions is of variable length.

17. The method of claim 16, wherein said VLIW processor includes a fixed-length VLIW register, said method further comprising the steps:

fetching a variable-length intermediate instruction from said high-speed buffer; and expanding and aligning said variable-length intermediate instruction fetched from said high-speed buffer to fit said fixed-length of said VLIW register.

18. The method of claim 14, wherein end of the particular tree-instruction is delimited by a primitive operation that follows an unconditional branch instruction and that is not reachable by any skip primitive within the particular tree-instruction, or when the end of the memory block is reached.

19. The method of claim 18, wherein the decomposing step includes the following step:

pruning said at least one tree-instruction according to said resources of said processing engine to generate a plurality of intermediate instructions.

20. The method of claim 19, wherein the pruning step replaces a skip primitive within said at least one tree instruction with a conditional branch primitive.

21. The method of claim 18, wherein said intermediate instructions each comprise a plurality of chunks.

22. The method of claim 21, wherein the step of executing said plurality of intermediate instructions stored in said high speed buffer in said processing engine includes the steps of:

for each path within said plurality of intermediate instructions, generating TEM data that identifies chunks within said plurality of intermediate instructions that are to be completed in the given path and that identifies chunks within said plurality of intermediate instructions that are not to be completed in the given path;

determining a selected path;

selecting TEM data corresponding to said selected path;

controlling functional units of said processing engine to complete operations contained in said chunks within said plurality of intermediate instructions according to said selected TEM data.

23. The method of claim 22, wherein said functional units of said processing engine complete operations contained in chunks identified by said selected TEM data as chunks that are to be completed.

24. The method of claim 22, wherein said functional units of said processing engine do not complete operations contained in chunks identified by said selected TEM data as chunks that are not to be completed.

25. The method of claim 21, wherein the decomposing step includes the following step:
pruning said at least one tree-instruction according to said resources of said processing engine to generate a plurality of intermediate instructions.

26. The method of claim 25, wherein said pruning step includes the following steps:
if resources required to execute said at least one tree instruction exceed resources of said processing engine,
generating first data associated with a given chunk that identifies one or more skip instructions within said given chunk as a pruning point,
identifying at least one chunk within said at least one tree instruction that is to be pruned; and
if final operation of the chunk preceding said at least one chunk is not an unconditional branch instruction, generating second data that identifies an implicit branch operation at end of said chuck preceding said at least one chunk.

27. The method of claim 26, wherein said skip instructions identified by said first data as pruning points are interpreted as conditional branch instructions to a separate tree instruction.

28. The method of claim 26, wherein the step of executing said plurality of intermediate instructions stored in said high speed buffer in said processing engine includes the steps of:
for each path within said plurality of intermediate instructions, generating TEM data that identifies chunks within said plurality of intermediate instructions that are to be completed in the given path and that identifies chunks within said plurality of intermediate instructions that are not to be completed in the given path, wherein, if said first data associated with a particular chunk identifies a skip instruction within the particular chunk as a pruning point, said TEM data corresponding to the particular chunk is set to indicate that the particular chunk is not to be completed in the given path;
determining a selected path;
selecting TEM data corresponding to said selected path;
controlling functional units of said processing engine to complete operations contained in said chunks within said plurality of intermediate instructions according to said selected TEM data.

29. The method of claim 28, wherein said functional units of said processing engine complete operations contained in chunks identified by said selected TEM data as chunks that are to be completed.

30. The method of claim 28, wherein said functional units of said processing engine do not complete operations contained in chunks identified by said selected TEM data as chunks that are not to be completed.

31. A data processing system comprising:
a memory storing a sequence of variable length tree-instructions, each given tree-instruction comprising a sequence of primitive instructions including at least one execution path which are subject to sequential semantics, wherein each execution path starting at a first primitive instruction of said sequence of primitive instructions for said given tree-instruction and terminating at an unconditional branch instruction to a target instruction outside of said tree-instruction;

instruction fetch means for fetching from said memory a block of data containing at least one variable length tree-instruction;

a pruning unit, coupled to said instruction fetch means, decomposing portions of said at least one variable length tree-instruction fetched from said memory into a plurality of intermediate instructions according to resources of a processing engine;

a high speed buffer, coupled to said pruning unit, storing said plurality of intermediate instructions;

wherein said processing engine executes said plurality of intermediate instructions stored in said high speed buffer.

32. The data processing system of claim 31, wherein said high speed buffer is a multi-level cache system.

33. The data processing system of claim 31, wherein said processing engine is a VLIW processor and each of said intermediate instructions is a variable-length VLIW.

34. The data processing system of claim 33, wherein said VLIW processor comprises:
a VLIW register having a fixed-length;
means for fetching one or more intermediate instructions from said high-speed buffer;
aligning means for aligning said one or more intermediate instructions fetched from said high-speed buffer such that said one or more intermediate instructions fit said fixed-length of said VLIW register; and
means for loading said one or more intermediate instructions generated by said aligning means into said fixed-length VLIW register.

35. The data processing system of claim 31, wherein each particular tree instruction includes at least one unconditional branch instruction which comprises a flow control operation to a target outside the particular tree instruction.

36. The data processing system of claim 31, wherein end of a particular variable length tree-instruction is delimited by a primitive operation that follows an unconditional branch instruction and that is not reachable by any skip primitive within the particular variable length tree-instruction.

37. The data processing system of claim 36, wherein said processing unit prunes said at least one variable length tree-instruction according to said resources of said processing engine to generate a plurality of intermediate instructions.

38. The data processing system of claim 37, wherein said pruning unit replaces a skip primitive within said at least one variable length tree-instruction with a conditional branch primitive in pruning said at least one variable length tree-instruction.

39. The data processing system of claim 31, wherein said variable length tree-instructions and said intermediate instructions each comprise a plurality of chunks.

40. The data processing system of claim 39, wherein said processing engine comprises:
a branch evaluation unit determining a selected path within each said intermediate instruction;
a TEM generator, coupled to said branch evaluation unit, that, for each path within each said intermediate instruction, generates TEM data that identifies chunks within each said intermediate instruction that are to be completed in the given path and that identifies chunks within each said intermediate instruction that are not to be completed in the given path, and that selects TEM data corresponding to said selected path; and functional units that complete operations contained in said chunks within each said intermediate instruction according to said selected TEM data.

41. The data processing system of claim 40, wherein said functional units complete operations contained in chunks identified by said selected TEM data as chunks that are to be completed.

42. The data processing system of claim 40, wherein said functional units do not complete operations contained in chunks identified by said selected TEM data as chunks that are not to be completed.

43. The data processing system of claim 39, wherein said pruning unit prunes said at least one variable length tree-instruction according to said resources of said processing engine to generate a plurality of intermediate instructions.

44. The data processing system of claim 43, wherein, if resources required to execute said at least one variable length tree-instruction exceed resources of said processing engine, said pruning unit generates first data associated with a given chunk that identifies one or more skip instructions within said given chunk as a pruning point;

identifies at least one chunk within said at least one variable length tree-instruction that is to be pruned; and if final operation of the chunk preceding said at least one chunk is not an unconditional branch instruction, generates second data that identifies an implicit branch operation at end of said chunk preceding said at least one chunk.

45. The data processing system of claim 44, wherein said skip instructions identified by said first data as pruning points are interpreted as conditional branch instructions to a separate variable length tree-instructions.

46. The data processing system of claim 43, wherein said processing engine comprises:

a branch evaluation unit for determining a selected path within each said intermediate instruction;

a TEM generator, coupled to said branch evaluation unit, that, for each path within each said intermediate instruction, generates TEM data that identifies chunks within each said intermediate instruction that are to be completed in the given path and that identifies chunks within each said intermediate instruction that are not to be completed in the given path, wherein, if said first data associated with a particular chunk identifies a skip instruction within said particular chunk as a pruning point, said TEM data corresponding to the particular chunk targeted by said skip instruction is set to indicate that the particular chunk is not to be completed in the given path; and functional units that complete operations contained in said chunks within each said intermediate instruction according to said selected TEM data.

47. The data processing system of claim 46, wherein said functional units complete operations contained in chunks identified by said selected TEM data as chunks that are to be completed.

48. The data processing system of claim 46, wherein said functional units do not complete operations contained in chunks identified by said selected TEM data as chunks that are not to be completed.

49. The data processing system of claim 31, wherein said block of data contains at least one complete tree-instruction, and said pruning unit decomposes said at least one complete tree-instruction.

50. The data processing system of claim 31, wherein said block of data contains at least one incomplete tree-instruction, and said pruning unit inserts an implicit unconditional branch to the next sequential address that is to occur after the last primitive instruction for said incomplete tree-instruction.

51. The data processing system of claim 31, wherein said sequence of primitive instructions for a given tree-instruction include multiple execution paths, whereby primitive conditional skip instructions that branch to primitive instructions within said tree-instruction spawn said execution paths, and whereby a sequential representation of said tree-instruction may be generated by traversing said execution paths in a depth first manner.

52. The data processing system of claim 51, wherein said block of data contains at least one incomplete tree-instruction, and said pruning unit inserts into an implicit unconditional branch instruction to the next sequential address that is to occur after the last primitive instruction for said incomplete tree-instruction, and replaces any primitive conditional skip instruction to a location outside said block of data with a conditional branch instruction to said location outside said block of data.

53. A method of executing a program stored in memory, said program characterized as being a set of variable length tree-instructions, each given tree-instruction comprising a sequence of primitive instructions including at least one execution path which are subject to sequential semantics, wherein each execution path starting at a first primitive instruction of said sequence of primitive instructions for said given tree-instruction and terminating at an unconditional branch instruction to a target instruction outside of said tree-instruction, the method comprising the steps of:

accessing said memory to fetch a memory block;

decomposing portions of said at least one variable tree-instruction stored in said memory block into a plurality of variable length intermediate instructions according to resources of a processor; and executing said variable length intermediate instructions in said processor.

* * * * *